(12) United States Patent
Shimura et al.

(10) Patent No.: US 7,133,610 B1
(45) Date of Patent: Nov. 7, 2006

(54) OPTICAL SENDER, TERMINAL DEVICE, AND OPTICAL COMMUNICATION SYSTEM EACH HAVING THE OPTICAL SENDER

(75) Inventors: Yoshitaka Shimura, Kawasaki (JP); Motoyoshi Sekiya, Kawasaki (JP); Keisuke Imai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/168,688

(22) Filed: Oct. 9, 1998

(30) Foreign Application Priority Data

May 25, 1998 (JP) ................................ 10-142631

(51) Int. Cl.
H04B 10/08 (2006.01)
H04B 10/04 (2006.01)
H04J 14/02 (2006.01)

(52) U.S. Cl. ............................ 398/15; 398/33; 398/38; 398/94; 398/95; 398/196; 398/197; 398/198

(58) Field of Classification Search ................ 359/110, 359/124–134, 173, 159, 161; 398/10, 14, 398/15, 17, 21, 33, 38, 93–95, 158, 196, 398/197, 198

See application file for complete search history.

(56) References Cited

U.S. PATENT DOCUMENTS

| | | | | |
|---|---|---|---|---|
| 4,994,675 A | * | 2/1991 | Levin et al. ................ | 250/551 |
| 5,136,410 A | * | 8/1992 | Heiling et al. ............... | 359/110 |
| 5,223,967 A | * | 6/1993 | Udd .......................... | 359/118 |
| 5,319,489 A | | 6/1994 | Audouin et al. | |
| 5,455,698 A | * | 10/1995 | Udd ............................ | 398/79 |
| 5,706,112 A | * | 1/1998 | Morita et al. ................ | 359/142 |
| 5,801,863 A | * | 9/1998 | Fatehi et al. ................ | 359/124 |
| 5,825,949 A | * | 10/1998 | Choy et al. ................... | 385/24 |
| 5,920,414 A | * | 7/1999 | Miyachi et al. ............. | 359/133 |
| 6,031,647 A | * | 2/2000 | Roberts ....................... | 359/124 |
| 6,081,359 A | * | 6/2000 | Takehana et al. ........... | 359/133 |
| 6,128,111 A | * | 10/2000 | Roberts ....................... | 359/110 |
| 6,134,034 A | * | 10/2000 | Terahara ..................... | 359/124 |
| 6,157,475 A | * | 12/2000 | Dugan et al. ............... | 359/110 |
| 6,295,147 B1 | * | 9/2001 | Yamane et al. ............. | 359/124 |

FOREIGN PATENT DOCUMENTS

EP 0 617 526 9/1994

OTHER PUBLICATIONS

U.S. Appl. No. 08/859,253, filed May 20, 1997, Miyazaki et al.

* cited by examiner

*Primary Examiner*—Dalzid Singh
(74) *Attorney, Agent, or Firm*—Staas & Halsey LLP

(57) ABSTRACT

The present invention relates to an optical sender applicable to WDM (wavelength division multiplexing), and a primary object of the present invention is to prevent interchannel crosstalk in WDM. The optical sender includes a light source for outputting a light beam, an optical modulator for modulating the light beam in accordance with a main signal to output an optical signal, and a unit for shutting down the optical signal when receiving at least one of a power alarm relating to on/off of power supply and a wavelength alarm relating to the wavelength of the light beam.

42 Claims, 24 Drawing Sheets

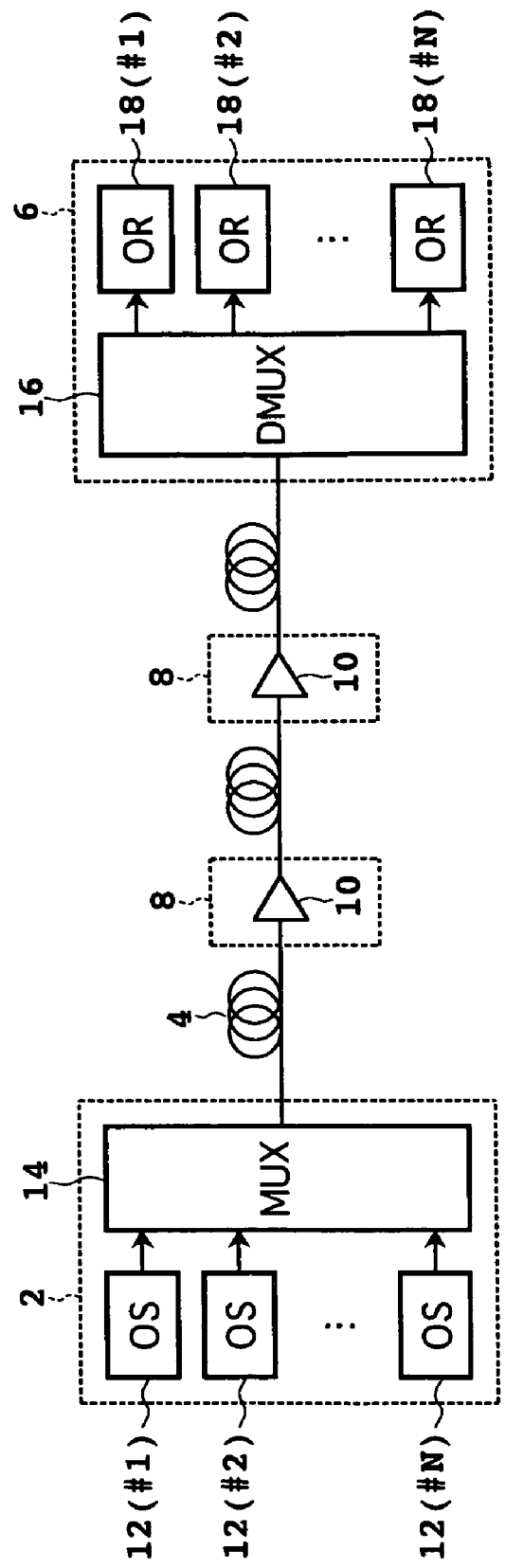

OPTICAL SENDER, TERMINAL DEVICE, AND OPTICAL COMMUNICATION SYSTEM EACH HAVING THE OPTICAL SENDER

BACKGROUND OF THE INVENTION

1. Field of the Invention

The present invention relates generally to prevention of interchannel crosstalk in wavelength division multiplexing (WDM), and more particularly to an optical sender, terminal device, and optical communication system each having the optical sender suitable for application to WDM.

2. Description of the Related Art

Known as a terminal device for WDM using a plurality of wavelength channels is a terminal device including a plurality of optical senders for outputting optical signals having different wavelengths and an optical multiplexer for wavelength division multiplexing the optical signals output from the optical senders to output WDM signal light. The WDM signal light is transmitted through an optical fiber transmission line to another terminal device. By applying such WDM using a plurality of wavelength channels, a large-capacity optical fiber communication system can be provided.

In an optical fiber communication system adopting WDM, the number of wavelength channels includable in a given wavelength band can be increased by reducing the spacing between adjacent wavelength channels. To achieve a larger capacity of the WDM system, a reduction in interchannel crosstalk is therefore required.

Each optical sender includes a light source for generating an optical signal per channel. In general, the light source is a laser diode for direct modulation or indirect modulation. The oscillation wavelength of the laser diode is determined by its temperature and drive current.

Due to the characteristics of the laser diode as mentioned above, the wavelength of an optical signal to be output from each optical sender tends to be unstable. For example, in starting up or shutting down the system or in the case of a trouble in relation to temperature control or the like performed in each optical sender, there is a possibility that the wavelength of the optical signal may be deviated from a target wavelength assigned to the corresponding channel, causing the occurrence of interchannel crosstalk. The interchannel crosstalk creates a problem that transmitted data cannot be accurately demodulated in a terminal device for receiving WDM signal light.

To prevent the interchannel crosstalk, additional provision of an optical bandpass filter in each optical sender may be proposed. The optical bandpass filter has a passband including the wavelength of the corresponding channel and excluding the wavelengths of the other channels. Accordingly, even when the wavelength of the optical signal is deviated from the target wavelength assigned to the corresponding channel, the crosstalk to the other channels can be prevented.

However, the additional provision of the optical bandpass filter in each optical sender makes complicated the configuration of a terminal device for transmission and invites a cost increase. Furthermore, the power of the optical signal obtained is reduced by insertion loss due to the optical bandpass filter.

SUMMARY OF THE INVENTION

It is therefore an object of the present invention to provide an optical sender which can prevent interchannel crosstalk in WDM without using an optical bandpass filter.

It is another object of the present invention to provide a terminal device which can prevent interchannel crosstalk in WDM without using an optical bandpass filter.

It is a further object of the present invention to provide an optical communication system which can prevent interchannel crosstalk in WDM without using an optical bandpass filter.

In accordance with an aspect of the present invention, there is provided an optical sender comprising a light source for outputting a light beam; an optical modulator for modulating said light beam in accordance with a main signal to output an optical signal; and means for shutting down said optical signal when receiving at least one of a power alarm relating to on/off of power supply and a wavelength alarm relating to the wavelength of said light beam.

With this configuration, the optical signal is shut down according to at least one of the power alarm and the wavelength alarm. Accordingly, in starting up or shutting down a system including the optical sender or in the case of a trouble in relation to temperature control or the like performed in the optical sender, an optical signal whose wavelength is deviated from a predetermined range can be prevented from being output from the optical sender. In other words, when the optical sender outputs an optical signal, the wavelength of the optical signal is maintained within the predetermined range.

Accordingly, by configuring each of plural optical senders included in a terminal device in accordance with the present invention, interchannel crosstalk in WDM can be prevented without using an optical bandpass filter.

In accordance with another aspect of the present invention, there is provided a terminal device for WDM. This terminal device comprises a plurality of optical senders for outputting optical signals having different wavelengths and an optical multiplexer for receiving the optical signals output from the optical senders to output WDM signal light. Each of the optical senders is an optical sender according to the present invention.

In accordance with a further aspect of the present invention, there is provided an optical communication system for WDM. This system comprises first and second terminal devices and an optical fiber transmission line for connecting the first and second terminal devices. At least one of the first and second terminal devices is a terminal device according to the present invention.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 1 is a block diagram of an optical fiber communication system to which the present invention is applicable;

DESCRIPTION OF THE PREFERRED EMBODIMENTS

Figure 2A:
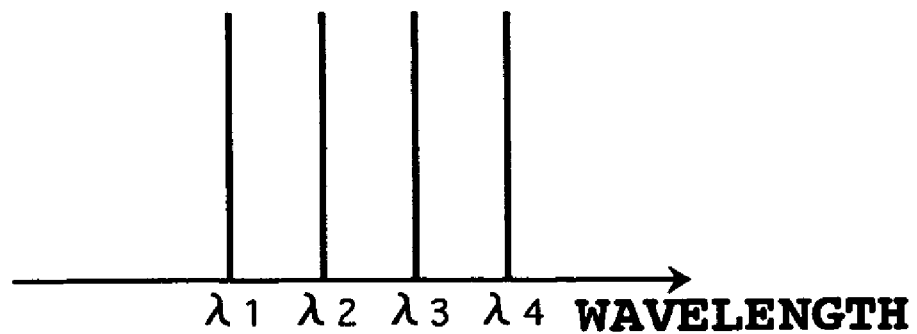
FIGS. 2A and 2B are schematics for illustrating the occurrence of interchannel crosstalk in WDM (wavelength division multiplexing)

Some preferred embodiments of the present invention will now be described in detail with reference to the attached drawings. Throughout the drawings, substantially the same parts are denoted by the same reference numerals.

FIG. 1 is a block diagram of an optical fiber communication system to which the present invention is applicable. This system includes a first terminal device 2 for outputting WDM signal light, an optical fiber transmission line 4 for transmitting the WDM signal light output from the terminal device 2, and a second terminal device 6 for receiving the WDM signal light transmitted by the transmission line 4.

The first terminal device 2 includes a plurality of optical senders (OS) 12 (#1 to #N) and an optical multiplexer (MUX) 14. The optical senders 12 (#1 to πN) are respectively connected to a plurality of input ports of the optical multiplexer 14. An output port of the optical multiplexer 14 is connected to the optical fiber transmission line 4. The optical multiplexer 14 functions to wavelength division multiplex a plurality of input optical signals and output resultant WDM signal light.

A plurality of optical repeaters 8 are arranged along the optical fiber transmission line 4 to compensate for attenuation of the WDM signal light in the optical fiber transmission line 4. Each optical repeater 8 has an optical amplifier 10 for amplifying the WDM signal light. The optical amplifier 10 may be configured of an optical amplifying medium for receiving the WDM signal light and means for pumping the optical amplifying medium so that the optical amplifying medium provides a gain band including the band of the WDM signal light.

As the optical amplifying medium, a doped fiber doped with a rare earth element may be used. In this case, the pumping means includes a pumping source for outputting pump light having a predetermined wavelength and an optical circuit for supplying the pump light into the doped fiber from at least one of a first end and a second end of the doped fiber. For example, Er (erbium) is suitable as the dopant for amplification of an optical signal in a wavelength band of 1.55 µm. In this case, a wavelength band of 0.98 µm or 1.48 µm is selected as the wavelength of the pump light. A semiconductor chip may also be used to provide the optical amplifying medium. In this case, the pumping means includes means for injecting a current into the semiconductor chip.

The second terminal device 6 includes an optical demultiplexer (DMUX) 16 for separating the WDM signal light received into a plurality of channels of optical signals and a plurality of optical receivers (OR) 18 (#1 to #N) for respectively receiving the individual optical signals.

In such an optical fiber communication system adopting WDM, a transmission capacity per circuit of the optical fiber transmission line can be increased according to the number of WDM channels. Further, a transmission distance can also be increased by arranging at least one optical amplifier along the optical fiber transmission line.

The occurrence of interchannel crosstalk in WDM will now be described with reference to FIGS. 2A and 2B. For convenience of description, it is assumed that the number of WDM channels is 4 and that the wavelengths assigned to the WDM channels are $\lambda_1$, $\lambda_2$, $\lambda_3$ and $\lambda_4$ ($\lambda_1 < \lambda_2 < \lambda_3 < \lambda_4$) as shown in FIG. 2A.

Figure 2B:

It is now assumed that the wavelength λ3 assigned to the third channel has been changed to $\lambda_3'$ ($\lambda_3' < \lambda_1$) as shown in FIG. 2B because of any trouble in the optical sender for the third channel and that the wavelengths assigned to the other channels remain unchanged.

If in this case the wavelength $\lambda_3'$ of the third channel is adjusted to be reset to $\lambda_3$, the wavelength of the third channel overlaps the wavelengths ($\lambda_1$ and $\lambda_2$) assigned to the first and second channels with some timing, causing easy occurrence of data errors in the first and second channels due to crosstalk.

Figure 3:
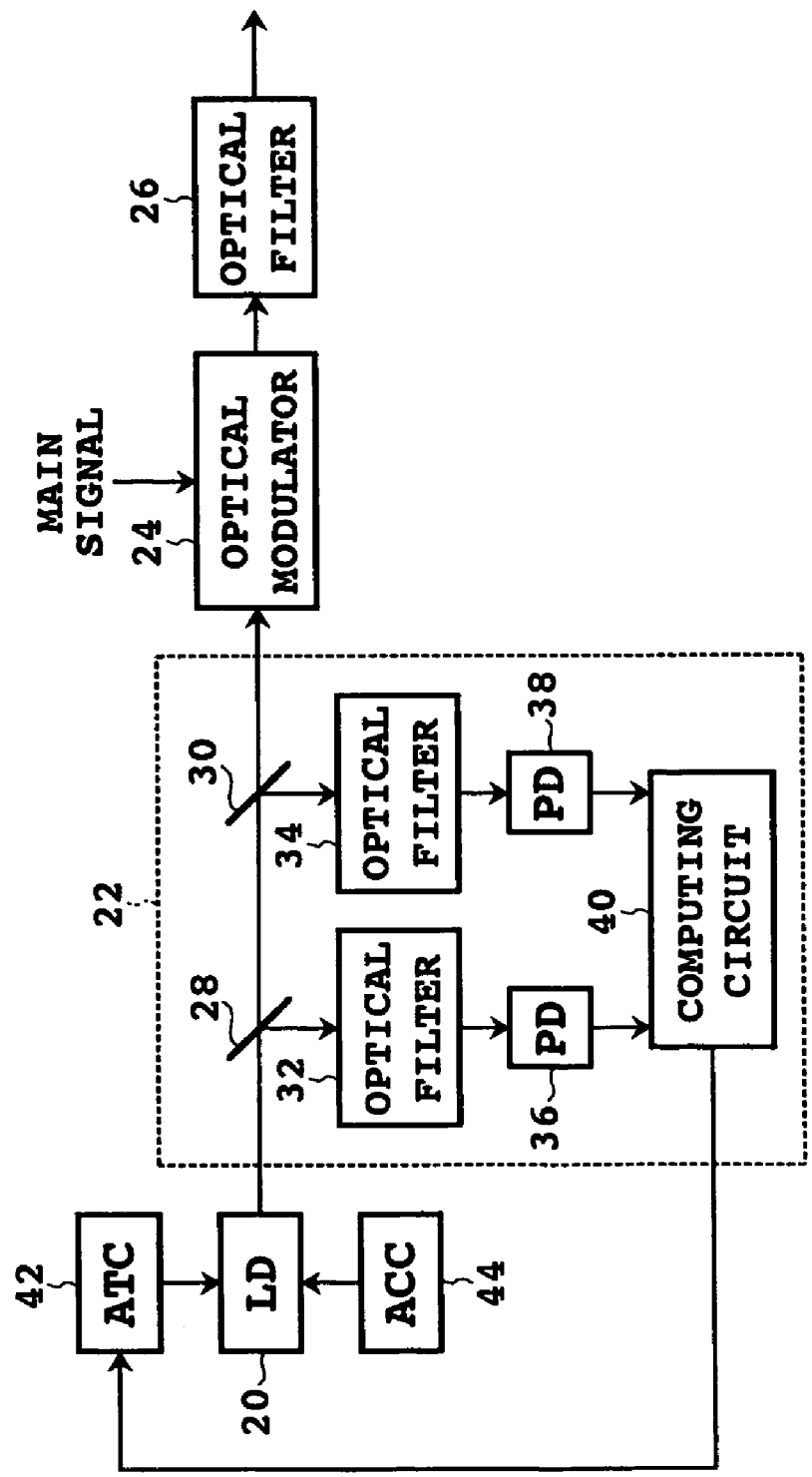
FIG. 3 is a block diagram of a conventional optical sender.

Referring to FIG. 3, there is shown a conventional optical sender usable as each of the optical senders 12 (#1 to #N) shown in FIG. 1. This optical sender has a laser diode (LD) 20 as a light source for outputting a light beam provided as continuous wave (CW) light.

The light beam output from the laser diode 20 is detected in its wavelength by a wavelength monitor 22, and thereafter modulated by an optical modulator 24 in accordance with a main signal. An optical signal obtained as the result of this modulation in the optical modulator 24 is output through an optical bandpass filter 26 having a center wavelength coinciding with the wavelength of a channel assigned to this optical sender.

The wavelength monitor 22 includes two optical couplers 28 and 30 for distributing two monitoring beams from the light beam output from the laser diode 20, optical bandpass filters 32 and 34 through which the two monitoring beams from the optical couplers 28 and 30 are passed, respectively, photodetectors (PD) 36 and 38 for respectively receiving light passed through the filters 32 and 34, and a computing circuit 40 for performing computation according to output signals from the photodetectors 36 and 38. The filters 32 and 34 respectively have wavelengths shorter and longer than the wavelength assigned to this optical sender as the center wavelengths in the respective passbands. Accordingly, the computing circuit 40 computes the ratio or difference between output signals from the photodetectors 36 and 38 to thereby make an output signal from the computing circuit 40 reflect the wavelength of the output light beam from the laser diode 20.

The temperature of the laser diode 20 is controlled by an automatic temperature control (ATC) circuit 42 to maintain constant the wavelength of the light beam output from the laser diode 20. The ATC circuit 42 controls the temperature of the laser diode 20 so that the output signal from the computing circuit 40 in the wavelength monitor 22 is maintained constant.

The laser diode 20 is supplied with a constant drive current (bias current) by an automatic current control (ACC) circuit 44.

Figure 4A:
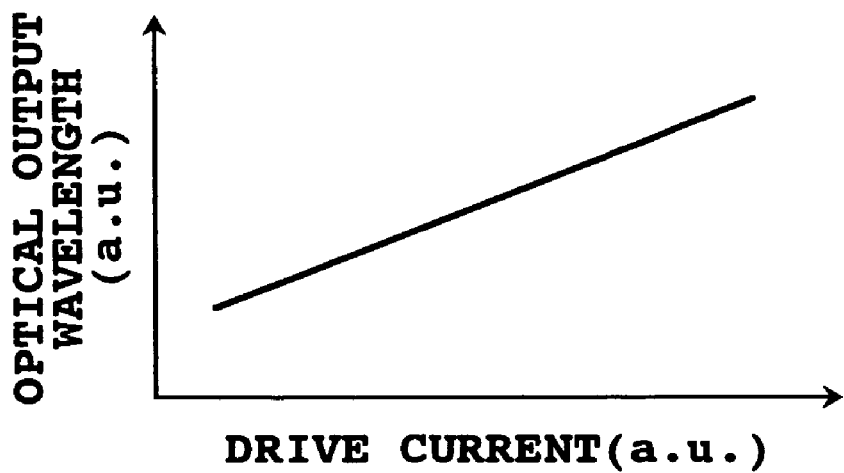
FIG. 4A is a graph showing a relation between output wavelength and drive current of a laser diode.
Figure 4B:
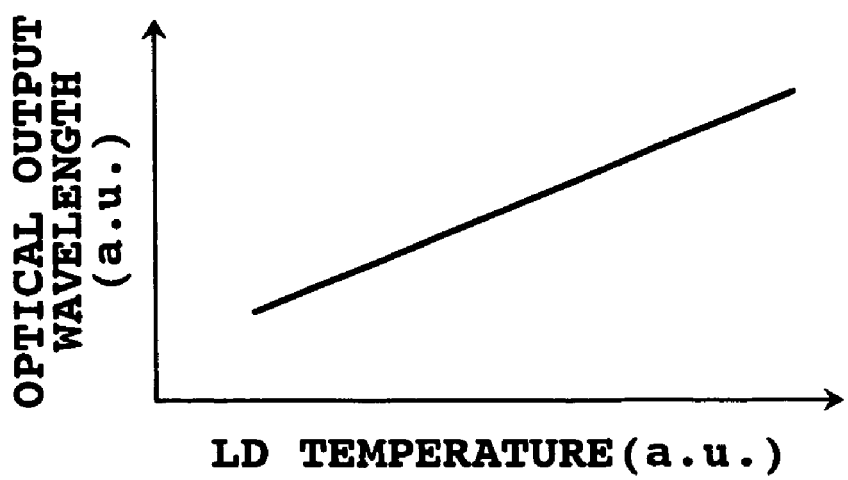
FIG. 4B is a graph showing a relation between output wavelength and temperature of a laser diode.

Referring to FIG. 4A, there is shown a relation between output wavelength and drive current of a laser diode. The output wavelength of the laser diode increases with an increase in the drive current. Referring to FIG. 4B, there is shown a relation between output wavelength and temperature of a laser diode. The output wavelength of the laser diode increases with an increase in the temperature. Accordingly, by maintaining constant the drive current for the laser diode 20 with the ACC circuit 44 and controlling the temperature of the laser diode 20 so that the result of monitoring by the wavelength monitor 22 is maintained constant as in the configuration shown in FIG. 3, the wavelength of an optical signal to be output from the optical sender shown in FIG. 3 can be maintained constant.

The reason why the optical bandpass filter 26 is provided on the output side of the optical modulator 24 in the configuration shown in FIG. 3 is to prevent interchannel crosstalk in the case that the optical sender shown in FIG. 3 is used as each of the optical senders 12 (#1 to #N) shown in FIG. 1. That is, when the wavelength of an optical signal to be output from the optical sender is shifted from the assigned wavelength because of a malfunction of the wavelength monitor 22 or the ATC circuit 42, the optical signal whose wavelength has been shifted is blocked by the optical bandpass filter 26 to thereby prevent an adverse effect of the optical signal output from the optical sender on an optical signal output from another normal optical sender.

However, in the case of using the optical bandpass filter 26 in each channel as in the prior art shown in FIG. 3, the configuration of each optical sender or the terminal device becomes complicated. Furthermore, the power of each optical signal is reduced by the insertion loss due to the optical bandpass filter 26.

Figure 5:
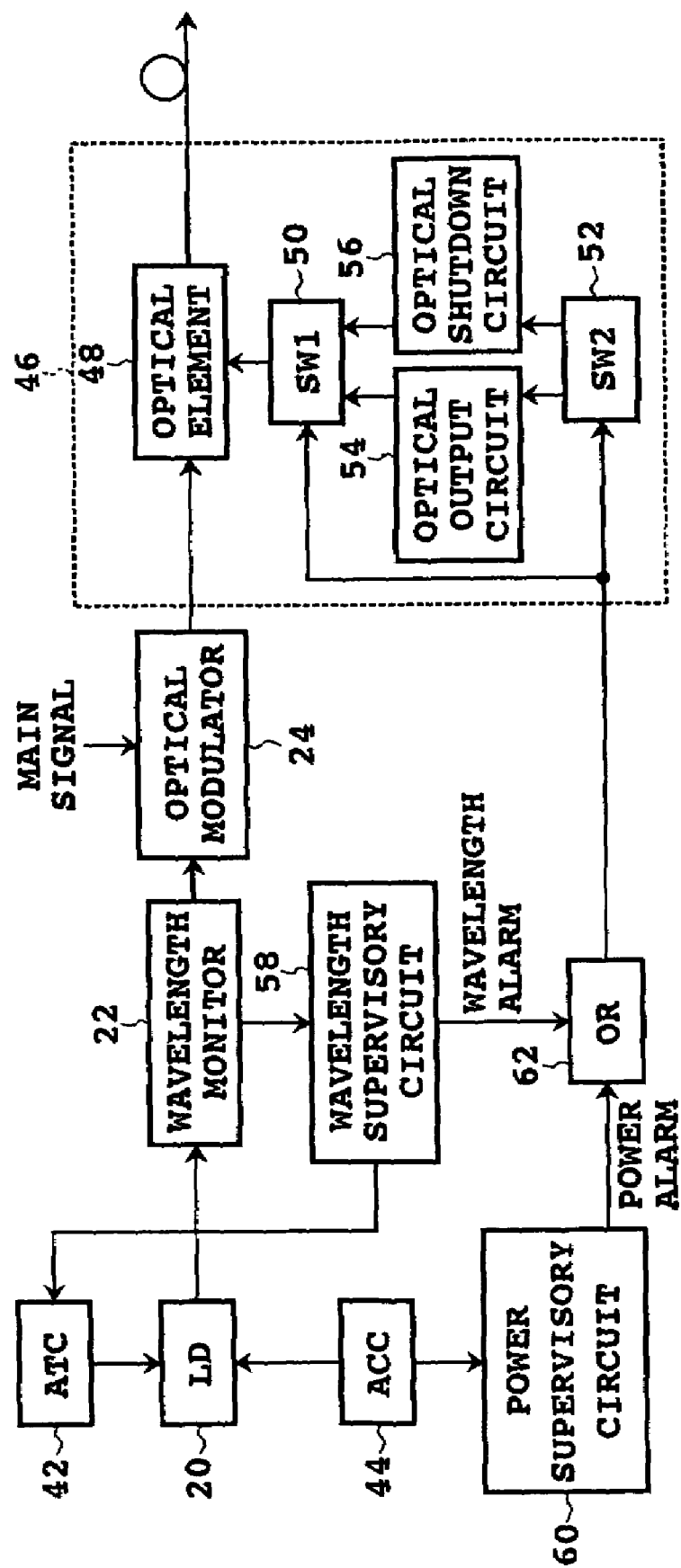
FIG. 5 is a block diagram showing a basic configuration of the optical sender according to the present invention.

FIG. 5 is a block diagram showing a basic configuration of the optical sender according to the present invention. In contrast with the prior art shown in FIG. 3, the basic configuration shown in FIG. 5 is characterized in that the optical bandpass filter 26 is omitted and a control unit 46 is provided instead. The control unit 46 includes an optical element 48 for receiving an optical signal output from the optical modulator 24, and a combination of switches 50 and 52, an optical output circuit 54, and an optical shutdown circuit 56 for changing the transmittance of the optical element 48 according to a given condition.

A wavelength supervisory circuit 58 is connected to the wavelength monitor 22, so as to generate a wavelength alarm relating to the wavelength of a light beam output from the laser diode 20 or the wavelength of an optical signal output from the optical modulator 24. The wavelength supervisory circuit 58 outputs a wavelength alarm, for example, when the wavelength detected by the wavelength monitor 22 has been deviated from a predetermined range. An output signal from the wavelength monitor 22 is supplied through the wavelength supervisory circuit 58 to the ATC circuit 42.

A power supervisory circuit 60 is connected to the ACC circuit 44, so as to generate a power alarm relating to on/off of power supply in the optical sender. The power supervisory circuit 60 outputs a power alarm, for example, when the supply of a current (power) from the ACC circuit 44 to the laser diode 20 becomes on or off, and continues the output of the power alarm during a predetermined period of time.

The wavelength alarm and the power alarm are supplied through an OR circuit 62 to the control unit 46. When the control unit 46 receives at least one of the wavelength alarm and the power alarm, the optical element 48 is controlled so that the transmittance of the optical element 48 is reduced.

More specifically, when at least one of the wavelength alarm and the power alarm is supplied to the control unit 46, the optical shutdown circuit 56 is selected by the switches 50 and 52, thereby reducing the transmittance of the optical element 48 according to the operation of the optical shutdown circuit 56. Conversely, when none of the wavelength alarm and the power alarm is supplied to the control unit 46, the optical output circuit 54 is selected by the switches 50 and 52, thereby increasing the transmittance of the optical element 48 according to the operation of the optical output circuit 54.

When the transmittance of the optical element 48 is low, the optical signal from the optical modulator 24 is blocked by the optical element 48 to thereby prevent interchannel crosstalk in the case of using this optical sender as each of the optical senders 12 (#1 to #N) shown in FIG. 1. When the transmittance of the optical element 48 is high, the optical signal from the optical modulator 24 can be output from this optical sender, thereby allowing transmission of the optical signal.

Figure 6:
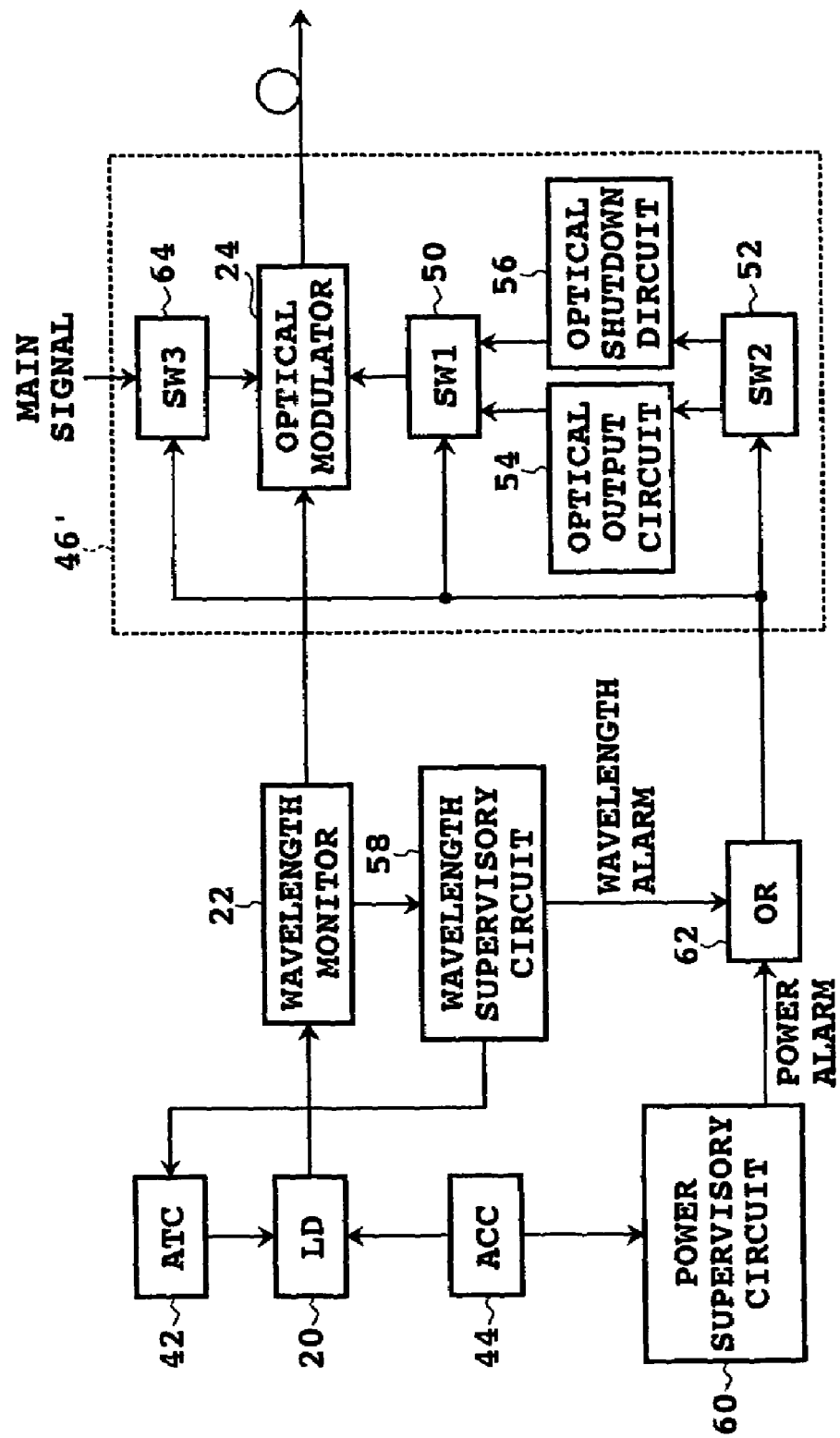
FIG. 6 is a block diagram showing another basic configuration of the optical sender according to the present invention.

FIG. 6 is a block diagram showing another basic configuration of the optical sender according to the present invention. In this basic configuration, the optical modulator 24 serves also as the optical element 48 shown in FIG. 5. That is, a control unit 46' including the optical modulator 24 is provided.

When receiving at least one of the wavelength alarm and the power alarm, the control unit 46' switches the operating point of the optical modulator 24 to thereby shut down the output of an optical signal from the optical modulator 24. For switching of the operating point, an additional switch 64 is connected to the OR circuit 62. The switch 64 operates to shut down the input of a main signal into the optical modulator 24 when receiving at least one of the wavelength alarm and the power alarm. Also according to the basic configuration shown in FIG. 6, interchannel crosstalk in WDM can be prevented without using an optical bandpass filter as similarly to the basic configuration shown in FIG. 5.

Figure 7:
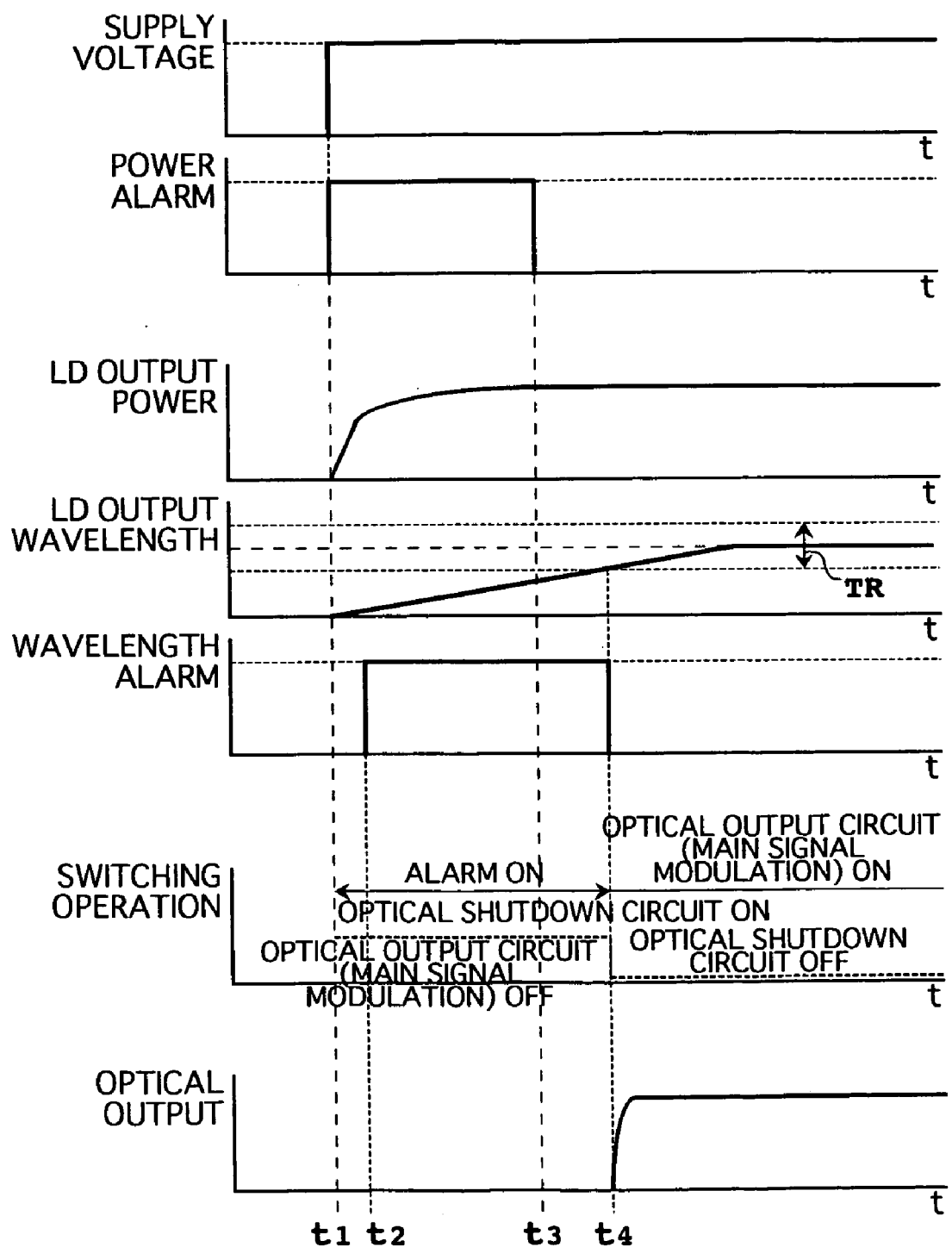
FIG. 7 is a timing chart in starting up the system.
Figure 8:
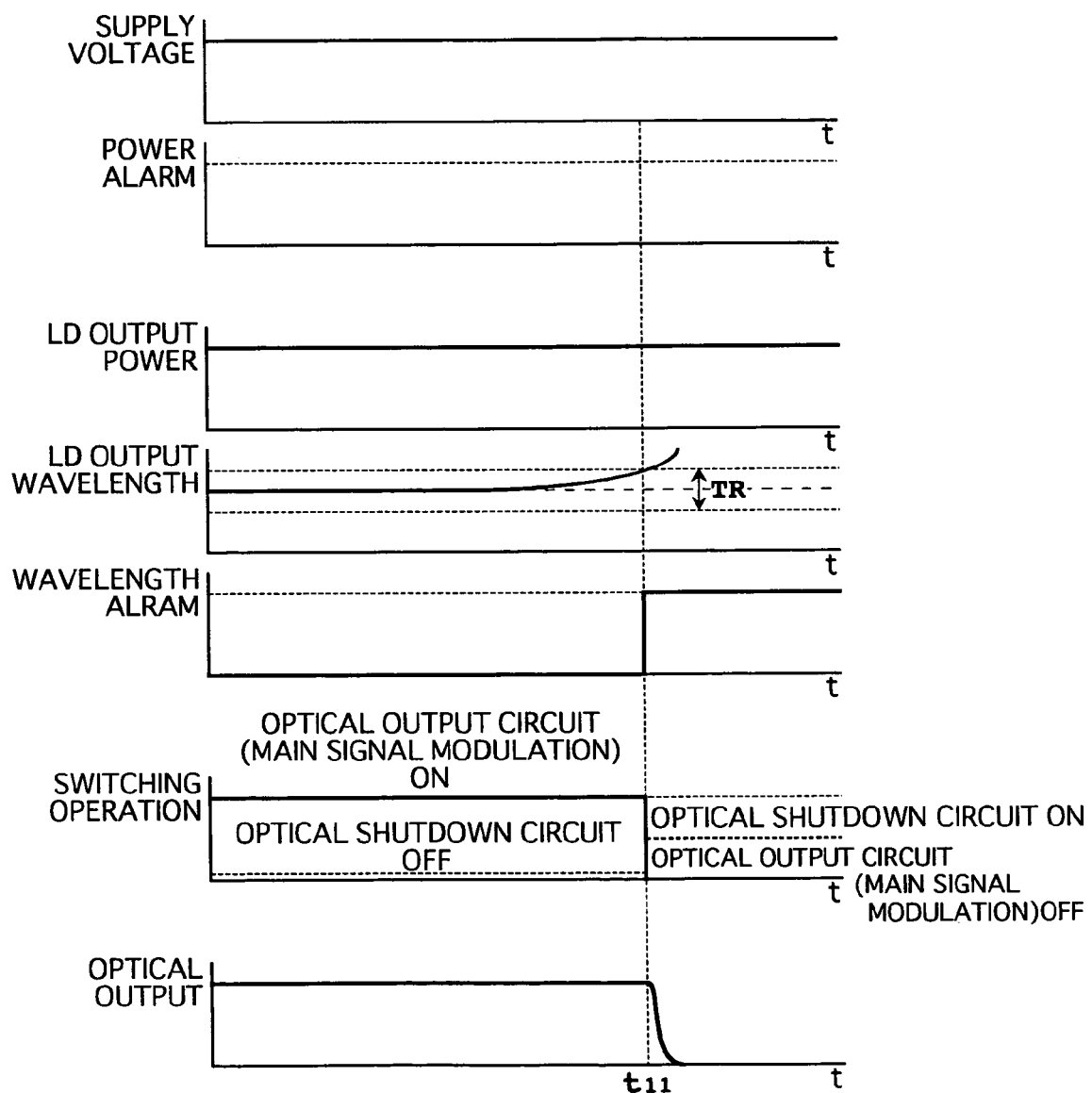
FIG. 8 is a timing chart in the case of wavelength anomaly.
Figure 9:
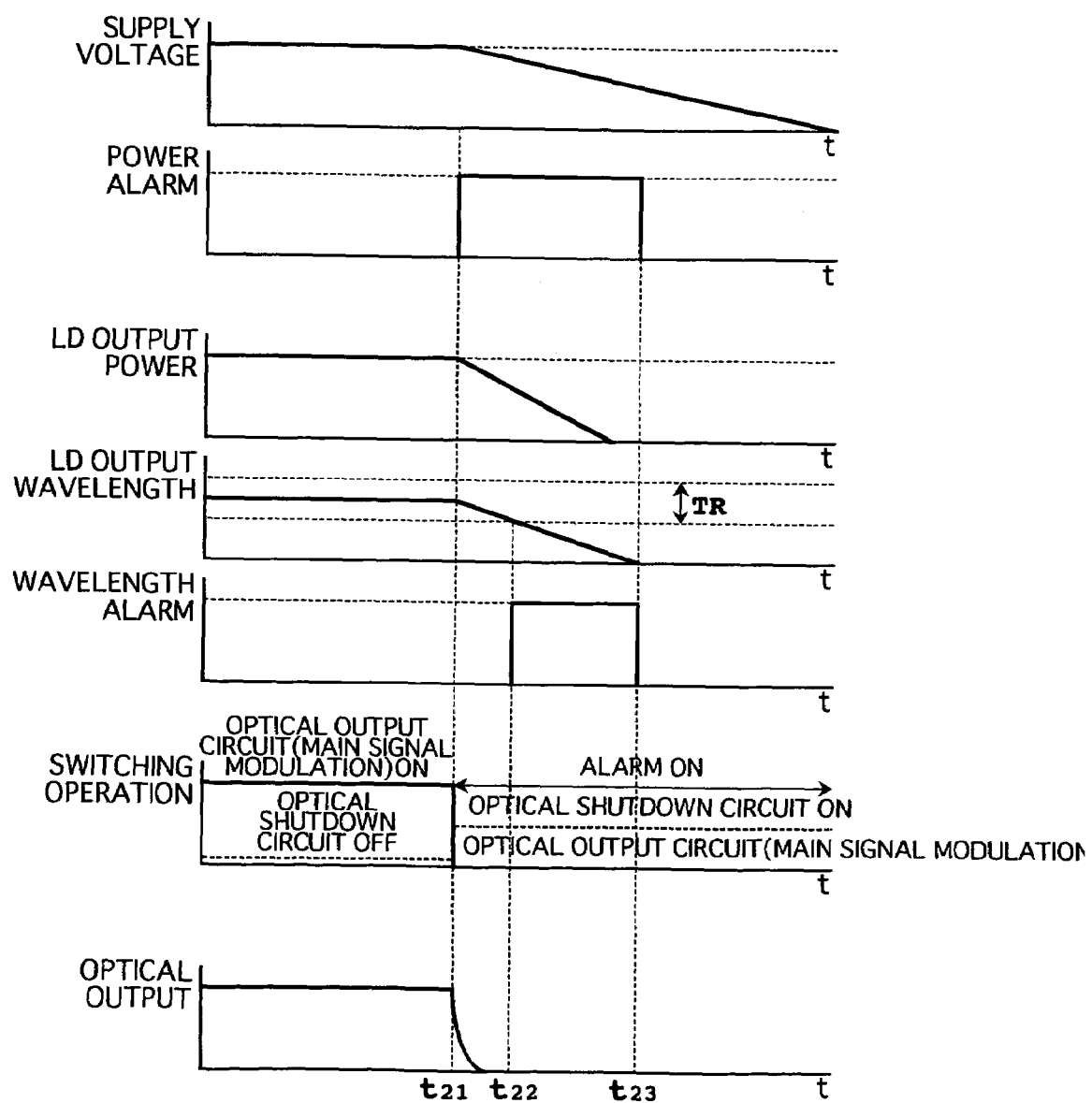
FIG. 9 is a timing chart in shutting down the system.

FIGS. 7, 8, and 9 are timing charts in starting up the system, in the case of wavelength anomaly, and in shutting down the system, respectively. In each of FIGS. 7, 8, and 9, there are shown vertically from the upper side a supply voltage, power alarm, output power of the laser diode 20, output wavelength of the laser diode 20, switching operation in the control unit 46 or 46', and optical output from the optical sender.

The operation of the optical sender in starting up the system will first be described with reference to FIG. 7. When the supply of power becomes on at a time $t_1$, a power alarm is output from the power supervisory circuit 60. At this time, the output power of the laser diode 20 starts to be changed in a stabilized direction by the operation of the ACC circuit 44, and the output wavelength of the laser diode 20 also starts to be changed in a stabilized direction by the operation of the ATC circuit 42. At a time $t_2$ slightly later than the time $t_1$, a wavelength alarm is output from the wavelength supervisory circuit 58. While at least one of the wavelength alarm and the power alarm is being generated, the optical shutdown circuit 56 remains selected, so that the optical output from the optical sender remains shut down. The power alarm continues to be output during a predetermined period from the time $t_1$ to a time $t_3$. The duration of the power alarm is preset longer than a time period from the time the supply of power to the laser diode 20 becomes on to the time the output power of the laser diode 20 is stabilized.

When the output wavelength of the laser diode 20 enters a predetermined tolerance TR at a time $t_4$, the wavelength alarm becomes off, and accordingly the optical output circuit 54 is selected. In the basic configuration shown in FIG. 6, the supply of a main signal to the optical modulator 24 becomes on, and the shutdown condition of the optical signal is canceled. By the above operation, interchannel crosstalk in starting up the system is prevented.

The operation of the optical sender in the case of wavelength anomaly will now be described with reference to FIG. 8. When the output wavelength of the laser diode 20 lies within the tolerance TR, none of the power alarm and the wavelength alarm is generated, so that the optical output circuit 54 is selected to maintain a condition where the optical signal is being output from the optical sender. When the output wavelength of the laser diode 20 is deviated from the tolerance TR at a time $t_{11}$, a wavelength alarm is output from the wavelength supervisory circuit 58 and the wavelength alarm is supplied to the control unit 46 or 46'. Accordingly, the optical output circuit 54 is switched to the optical shutdown circuit 56. In the basic configuration shown in FIG. 6, the supply of a main signal to the optical modulator 24 is shut down, thereby shutting down the output of the optical signal from the optical sender. By the above operation, interchannel crosstalk in the case of wavelength anomaly is prevented.

The operation of the optical sender in shutting down the system will now be described with reference to FIG. 9. When the supply of power becomes off at a time $t_{21}$, a power alarm is generated. At this time, the output power and the output wavelength of the laser diode 20 start to be gradually changed. When the output wavelength of the laser diode 20 is deviated from the tolerance TR at a time $t_{22}$, a wavelength alarm is generated. Simultaneously with generation of the power alarm at the time $t_{21}$, the optical output circuit 54 is switched to the optical shutdown circuit 56. In the basic configuration shown in FIG. 6, the supply of a main signal to the optical modulator 24 is shut down, thereby shutting down the output from the optical signal from the optical sender. By the above operation, interchannel crosstalk in shutting down the system is prevented.

Figure 10:
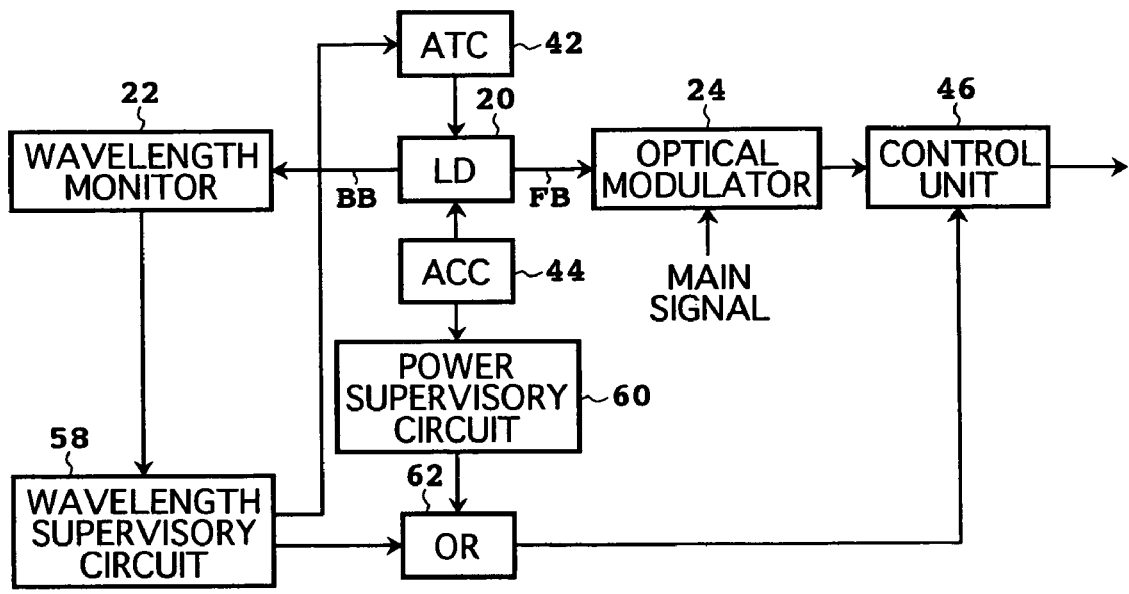
FIG. 10 is a block diagram showing a modification of the optical sender shown in FIG. 5.

FIG. 10 is a block diagram showing a modification of the optical sender shown in FIG. 5. In the configuration shown in FIG. 5, the light beam output from the laser diode 20 is supplied through the wavelength monitor 22 to the optical modulator 24. In contrast therewith, the optical sender shown in FIG. 10 uses both a forward beam FB and a backward beam BB output from the laser diode 20. The forward beam FB is supplied to the optical modulator 24 and then modulated by a main signal to obtain an optical signal. The backward beam BB is supplied to the wavelength monitor 22 and its wavelength is monitored by the wavelength monitor 22. The forward beam FB and the backward beam BB have the same wavelength, so that this configuration also allows wavelength monitoring of the optical signal by use of the wavelength monitor 22. Particularly in this modification, the wavelength monitor 22 is not located in a main optical path including the optical modulator 24 and the control unit 46. Accordingly, a decrease in power of the optical signal due to insertion loss by the wavelength monitor 22 can be prevented.

Figure 11:
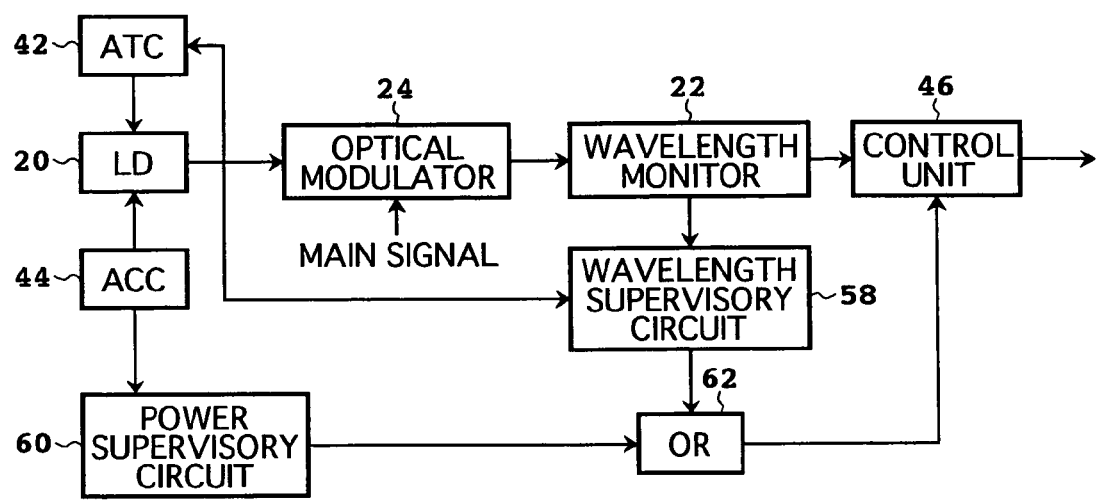
FIG. 11 is a block diagram showing another modification of the optical sender shown in FIG. 5.

FIG. 11 is a block diagram showing another modification of the optical sender shown in FIG. 5. In this modification, the positional relation between the optical modulator 24 and the wavelength monitor 22 is reverse to that in the configuration shown in FIG. 5. That is, the light beam output from the laser diode 20 is first modulated by a main signal in the optical modulator 24, and a resultant optical signal is supplied to the wavelength monitor 22. The optical signal passed through the wavelength monitor 22 is output through the control unit 46. Accordingly, the wavelength monitor 22 monitors the wavelength of the optical signal after modulation rather than the wavelength of CW light. Also according to this configuration, interchannel crosstalk in WDM can be prevented without using an optical bandpass filter.

Figure 12:
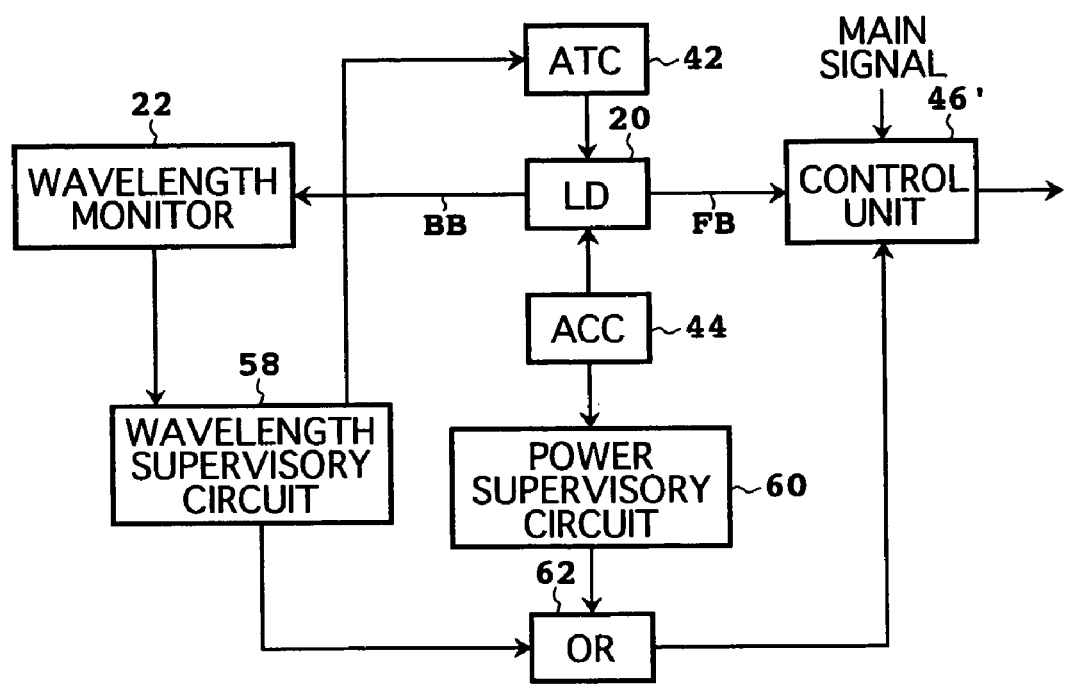
FIG. 12 is a block diagram showing a modification of the optical sender shown in FIG. 6.

FIG. 12 is a block diagram showing a modification of the optical sender shown in FIG. 6. This modification is characterized in that both a forward beam FB and a backward beam BB output from the laser diode 20 are used as in the optical sender shown in FIG. 10. The forward beam FB output from the laser diode 20 is modulated by the optical modulator 24 (not shown) included in the control unit 46', and a resultant optical signal is output from the optical sender. The backward beam BB output from the laser diode 20 is supplied to the wavelength monitor 22 and its wavelength is monitored by the wavelength monitor 22. Also according to this configuration, a decrease in power of the optical signal due to insertion loss by the wavelength monitor 22 can be prevented.

Figure 13A:
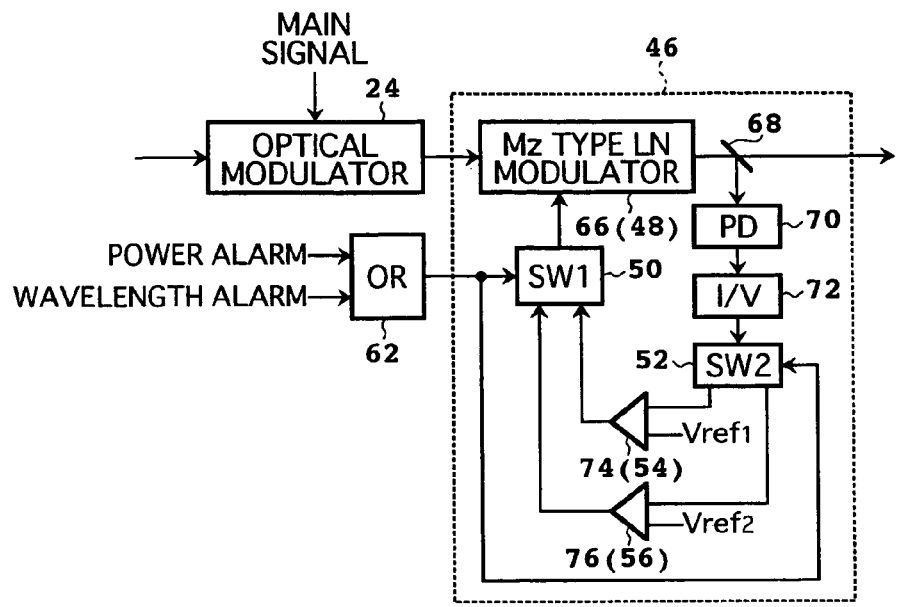
FIGS. 13A and 13B are block diagrams showing first and second preferred embodiments of a control unit 46 shown in FIG. 5, respectively.
Figure 13B:
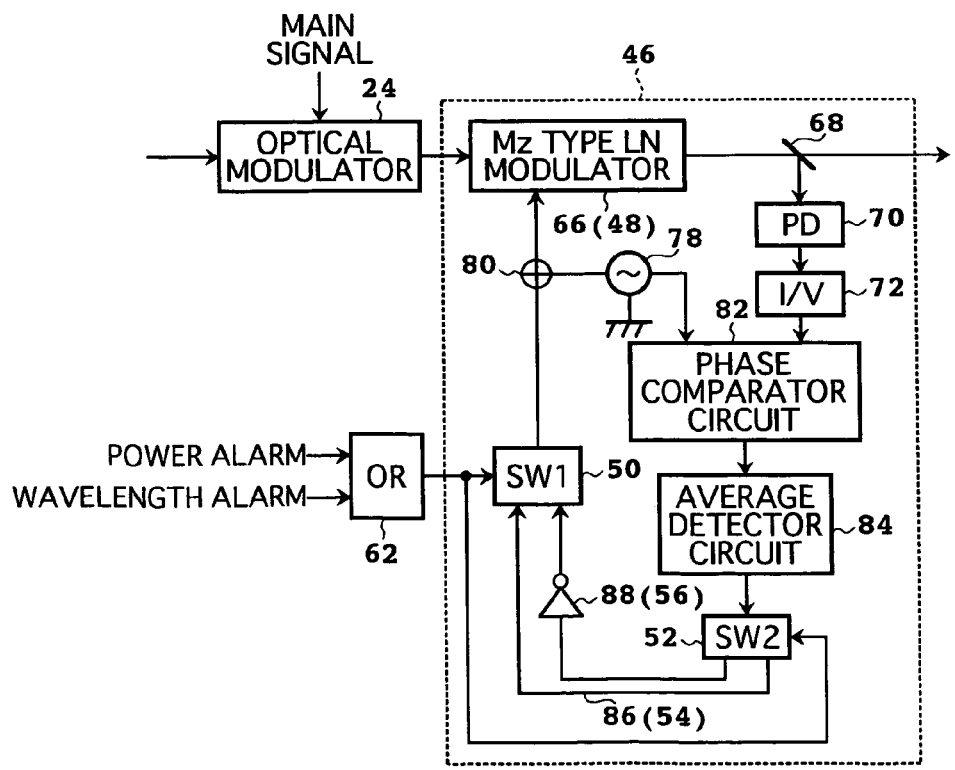

FIGS. 13A and 13B are block diagrams respectively showing first and second preferred embodiments of the control unit 46 shown in FIG. 5, for example. The control unit 46 includes the optical element 48 for shutting down an optical signal, which is independent of the optical modulator 24. Accordingly, a circuit for controlling the optical element 48 can be configured relatively simply.

In the first preferred embodiment shown in FIG. 13A, a Mach-Zehnder type lithium niobate modulator (MZ type LN modulator) 66 is used as the optical element 48. Further, the optical output circuit 54 and the optical shutdown circuit 56 connected in parallel between the switches 50 and 52 are provided by comparators 74 and 76, respectively. The comparator 74 is supplied with a reference voltage Vref1 corresponding to a relatively large transmittance of the MZ type LN modulator 66, and the comparator 76 is supplied with a reference voltage Vref2 corresponding to a relatively small transmittance of the MZ type LN modulator 66.

A part of the optical signal output from the modulator 66 is branched off by an optical coupler 68, and the branch light is converted into a current signal having a level corresponding to the power of the branch light by a photodetector 70. The current signal is then converted into a voltage signal by an I/V converter 72. The voltage signal is then supplied to either the comparator 74 or 76 selected by the switch 52.

For example, when none of the power alarm and the wavelength alarm is generated and the comparator 74 is accordingly selected, the comparator 74 supplies a bias voltage through the switch 50 to the modulator 66 so that the voltage level of the output signal from the I/V converter 72 coincides with the reference voltage Vref1. As a result, the optical signal from the optical modulator 24 is passed through the modulator 66 as the optical element 48 and output from the control unit 46.

On the other hand, when at least one of the power alarm and the wavelength alarm is generated and the comparator 76 is accordingly selected, the comparator 76 supplies a bias voltage through the switch 50 to the modulator 66 so that the voltage level of the output signal from the I/V converter 72 coincides with the reference voltage Vref2. As a result, the modulator 66 as the optical element 48 becomes a shutdown condition, so that the optical signal from the optical modulator 24 is blocked by the control unit 46 and the output of the optical signal from the optical sender is accordingly shut down.

The reason why the optical output level from the modulator 66 as the optical element 48 is actually monitored by the photodetector 70 and the I/V converter 72 is to accurately obtain a shutdown condition in the control unit 46 irrespective of occurrence of a DC drift that is a phenomenon that an operating characteristic curve representing the relation between transmittance (or output power) of the MZ type LN modulator 66 and bias voltage (drive voltage) therefor is changed along a bias voltage axis.

In the second preferred embodiment of the control unit 46 shown in FIG. 13B, a low-frequency signal from an oscillator 78 is superimposed on the bias voltage for the MZ type LN modulator 66 by an adder 80. By superimposing the low-frequency signal on the bias voltage, the output level from the modulator 66 is changed according to the low-frequency signal. Accordingly, the change in the output level is detected by the photodetector 70 and the I/V converter 72. The phase of the low-frequency signal from the oscillator 78 and the phase of the output signal from the I/V converter 72 are compared with each other by a phase comparator circuit 82, and an output signal from the phase comparator circuit 82 is supplied to an average detector circuit 84. An output signal from the average detector circuit 84 is changed or unchanged in polarity and then supplied as the bias voltage for the modulator 66. More specifically, the optical output circuit 54 is provided by a line 86 directly connecting the switches 50 and 52, and the optical shutdown circuit 56 is provided by an inverter 88 connected between the switches 50 and 52.

Figure 14:
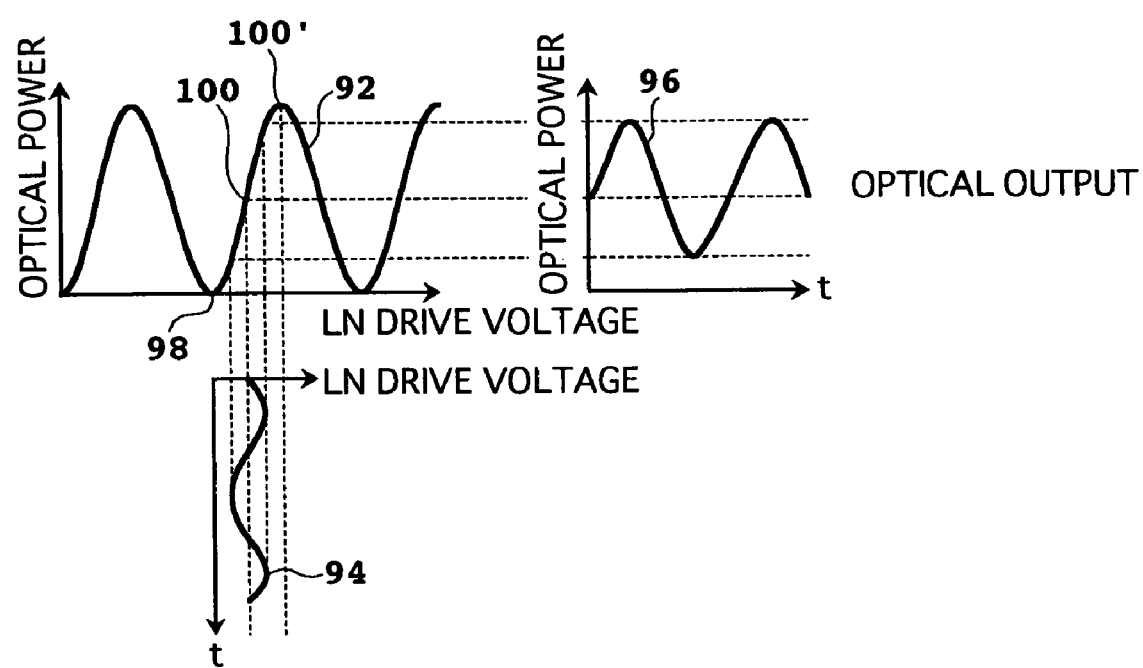
FIG. 14 is a graphic illustration of an operating characteristic of a Mach-Zehnder type lithium niobate modulator.

Referring to FIG. 14, there is shown an operating characteristic of an MZ type LN modulator. Reference numeral 92 denotes an operating characteristic curve representing the relation between output optical power of the modulator and drive voltage for the modulator. The operating characteristic curve 92 shows a characteristic such that the output optical power periodically changes with an increase in the drive voltage. In other words, the operating characteristic curve 92 is given as a substantially trigonometric function. The operating point of the modulator is set at a point 100 where a maximum positive slope in the operating characteristic curve 92 is given. When a low-frequency signal as shown by reference numeral 94 is superimposed on a bias voltage, the output optical power of the modulator changes in phase with the low-frequency signal 94 as shown by reference numeral 96.

According to the configuration of the second preferred embodiment of the control unit 46 shown in FIG. 13B, the operating point is converged to a point 98 where the output optical power becomes a minimum by voltage feedback through the inverter 88 when at least one of the power alarm and the wavelength alarm is generated. This operation will now be described more specifically.

FIGS. 15A to 15D are graphs for illustrating the operation in the preferred embodiment shown in FIG. 13B.

Figure 15A:
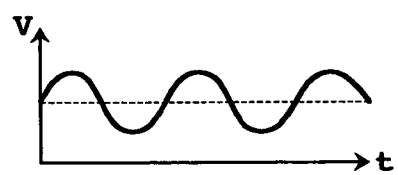
FIGS. 15A to 15D are graphs for illustrating the operation in the preferred embodiment shown in FIG. 13B.
Figure 15B:
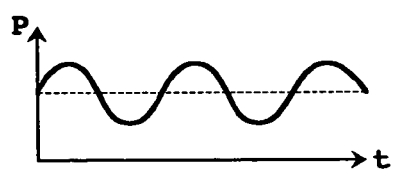
Figure 15C:
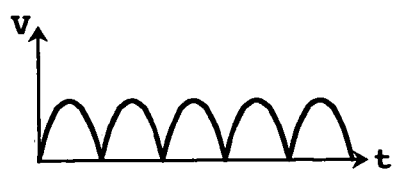
Figure 15D:
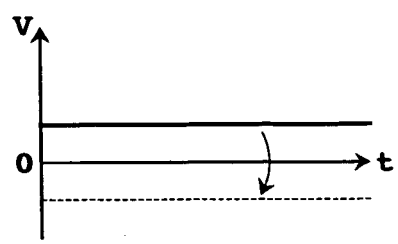

FIG. 15A shows a change in drive voltage for the modulator 66 due to superimposition of a low-frequency signal. FIG. 15B shows a change in output optical power of the modulator 66. In the case that the operating point 100 shown in FIG. 14 is selected, the output optical power changes in phase with the drive voltage for the modulator 66. FIG. 15C shows a waveform of an output signal from the phase comparator circuit 82. For example, a multiplier may be used as the phase comparator circuit 82. FIG. 15D shows an output voltage level from the average detector circuit 84. The output signal from the average detector circuit 84 is a DC signal, and the waveforms shown in FIGS. 15A and 15B are in phase. Accordingly, the output level from the average detector circuit 84 becomes positive.

Accordingly, in the case that at least one of the power alarm and the wavelength alarm is generated and the inverter 88 is therefore selected, a DC voltage having a negative value is applied as the bias voltage for the modulator 66. As the result of such voltage feedback, the operating point of the modulator 66 is converged to a minimum level of output optical power as shown by reference numeral 98 in FIG. 14. Thus, when at least one of the power alarm and the wavelength alarm is generated, the control unit 46 shuts down the optical signal from the optical modulator 24.

In the case that none of the power alarm and the wavelength alarm is generated and accordingly the switches 50 and 52 are connected with each other directly by the line 86, a positive DC voltage output from the average detector circuit 84 is fed back to the modulator 66, so that the operating point is converged to a point shown by reference numeral 100' in FIG. 14. As a result, the optical signal output from the optical modulator 24 is not shut down by the control unit 46.

Figure 16A:
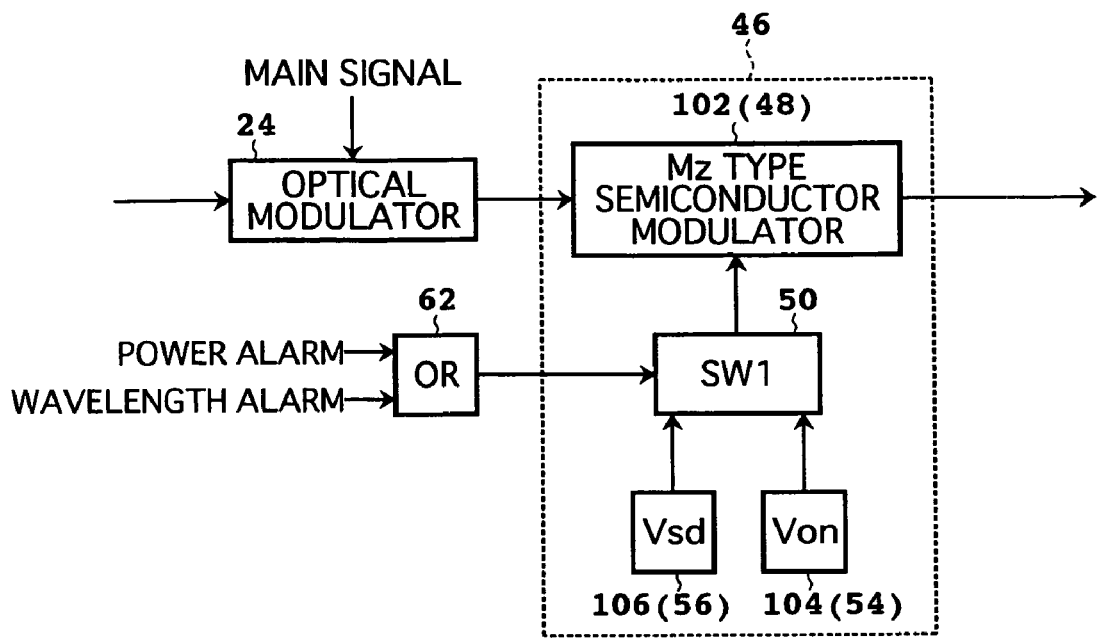
FIG. 16A is a block diagram showing a third preferred embodiment of the control unit 46 shown in FIG. 5.
Figure 16B:
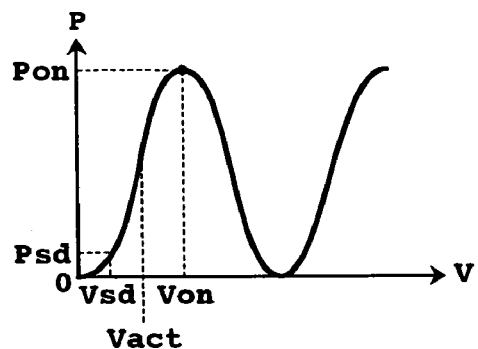
FIG. 16B is a graph showing a characteristic thereof.

FIG. 16A is a block diagram showing a third preferred embodiment of the control unit 46, and FIG. 16B is a graph showing a characteristic thereof. In this preferred embodiment, a Mach-Zehnder (MZ) type semiconductor modulator 102 is used as the optical element 48. As shown in FIG. 16B, an operating characteristic curve representing the relation between output optical power P and applied voltage V in the MZ type semiconductor modulator 102 has a periodicity like the MZ type LN modulator. That is, the output optical power P from the MZ type semiconductor modulator 102 changes trigonometrically with an increase in the applied voltage V.

It is known that a DC drift hardly occurs in the operating characteristic curve of the MZ type semiconductor modulator 102 unlike the MZ type LN modulator.

In the preferred embodiment shown in FIG. 16A based on this fact, a voltage Von giving a maximum optical output Pon is supplied from a voltage source 104 through the switch 50 to the modulator 102 when none of the power alarm and the wavelength alarm is generated. On the other hand, when at least one of the power alarm and the wavelength alarm is generated, a voltage Vsd giving a very small output optical power Psd is supplied from a voltage source 106 through the switch 50 to the modulator 102. That is, the voltage sources 104 and 106 respectively correspond to the optical output circuit 54 and the optical shutdown circuit 56 shown in FIG. 5. The single switch 50 is only necessary to switch between the voltage sources 104 and 106 in this preferred embodiment, so the switch 52 shown in FIG. 5 is omitted. The reason why the present invention can be embodied by switching between the constant voltage sources 104 and 106 without monitoring the output level from the modulator 102 is based on the fact that a DC drive hardly occurs in the operating characteristic curve as described above. Also according to this preferred embodiment, interchannel crosstalk in WDM can be prevented without using an optical bandpass filter.

Figure 17A:
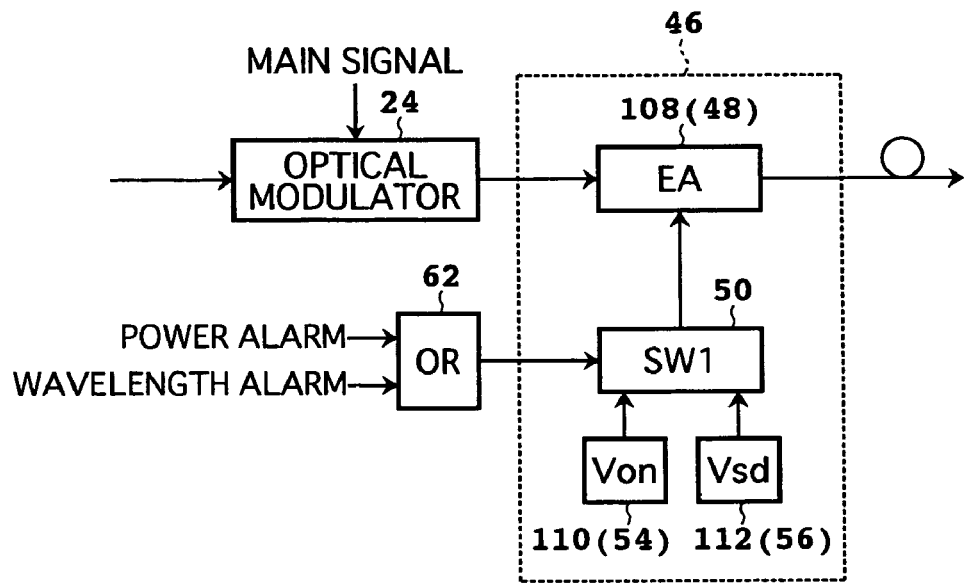
FIGS. 17A and 17B are block diagrams showing fourth and fifth preferred embodiments of the control unit 46 shown in FIG. 5, respectively.
Figure 17B:
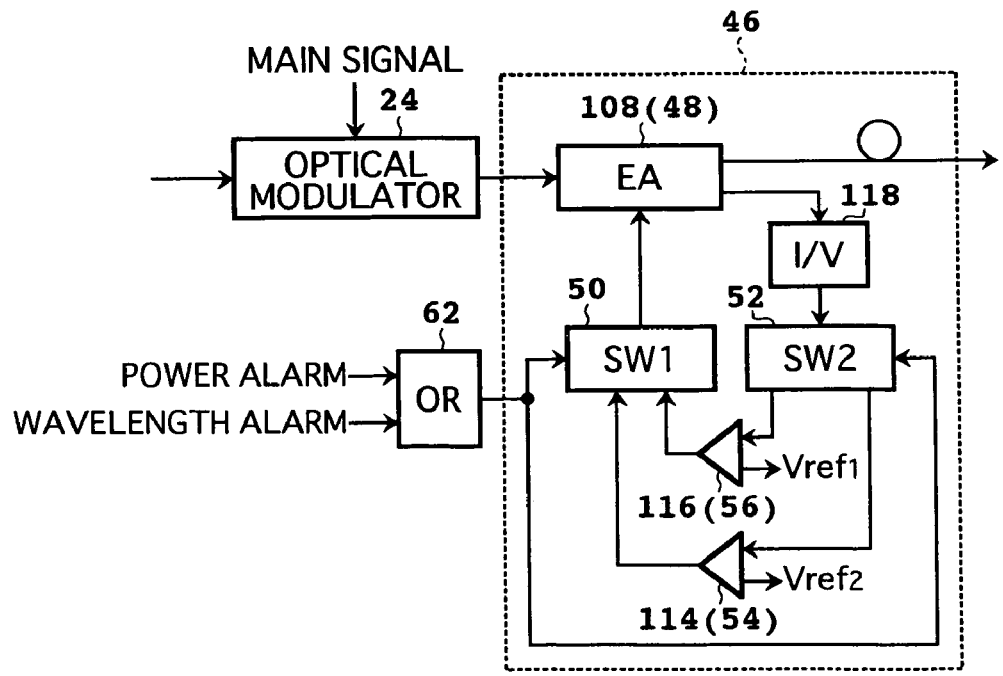

FIGS. 17A and 17B are block diagrams showing fourth and fifth preferred embodiments of the control unit 46, respectively. Each of the fourth and fifth preferred embodiments employs an electroabsorption type modulator (EA modulator) 108 as the optical element 48.

Figure 18:
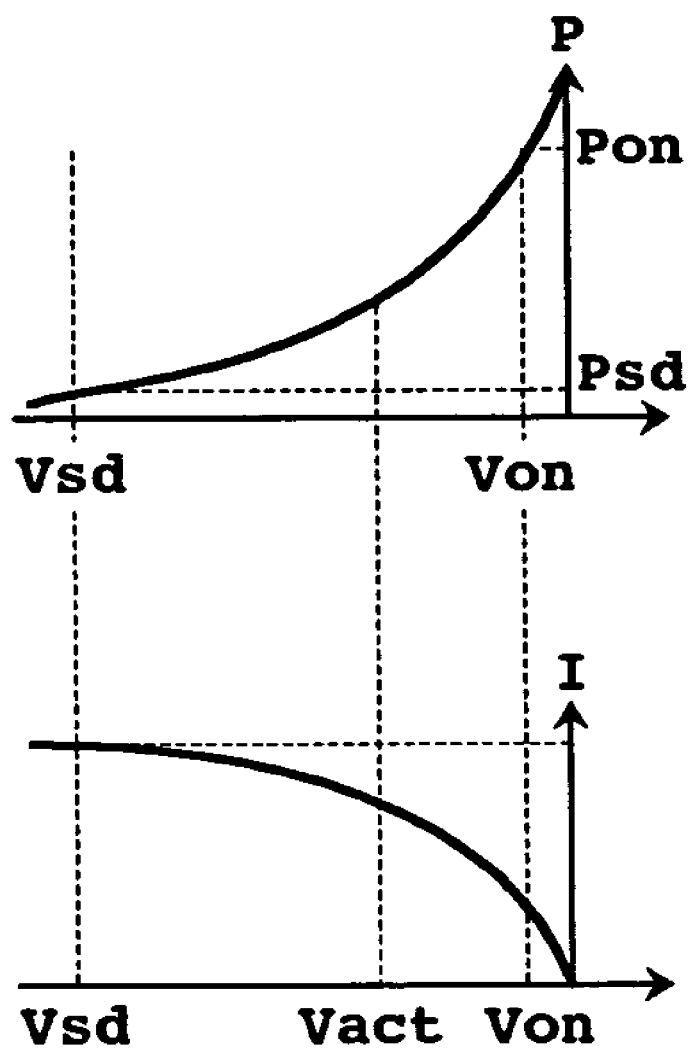
FIG. 18 is a graphic illustration of characteristics of an electroabsorption type modulator.

Referring to FIG. 18, there is shown characteristics of the EA modulator 108. The characteristics are such that the larger the negative value of an applied voltage, the larger the absorption and accordingly the lower the output optical power P and that the larger the absorption, the larger the photocurrent I to be detected.

In the fourth preferred embodiment shown in FIG. 17A, a voltage Von giving a relatively high output optical power Pon is supplied from a voltage source 110 through the switch 50 to the EA modulator 108 to obtain the output optical power Pon when none of the power alarm and the wavelength alarm is generated. On the other hand, when at least one of the power alarm and the wavelength alarm is generated, a voltage Vsd giving a nearly zero output optical power Psd is supplied from a voltage source 112 through the switch 50 to the EA modulator 108 to obtain the output optical power Psd.

Thus, the voltage sources 110 and 112 respectively correspond to the optical output circuit 54 and the optical shutdown circuit 56, and the switch 52 is omitted.

Also according to this preferred embodiment, interchannel crosstalk in WDM can be prevented without using an optical bandpass filter.

In the fifth preferred embodiment shown in FIG. 17B, the photocurrent generated in the EA modulator 108 is converted into a voltage signal by a I/V converter 118, and the voltage signal is then supplied to the switch 52. The optical output circuit 54 is provided by a comparator 114 supplied with a reference voltage Vref 2 to be selected so as to output Von. The optical shutdown circuit 56 is provided by a comparator 116 supplied with a reference voltage Vref1 to be selected so as to output Vsd.

When none of the power alarm and the wavelength alarm is generated, the optical signal output from the optical modulator 24 is almost transmitted by the EA modulator 108, thereby allowing the output of the optical signal from the optical sender. When at least one of the power alarm and the wavelength alarm is generated, the optical signal output from the optical modulator 24 is almost absorbed by the EA modulator 108, thereby blocking the output of the optical signal from the optical sender. Thus, also according to this preferred embodiment, interchannel crosstalk in WDM can be prevented without using an optical bandpass filter.

Figure 19A:
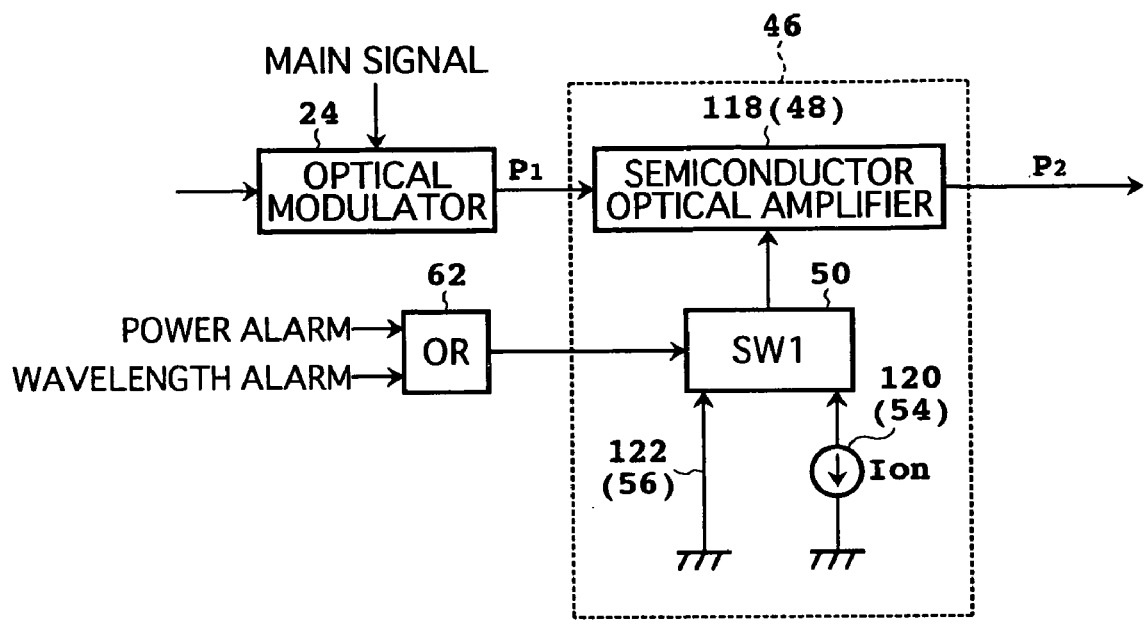
FIG. 19A is a block diagram showing a sixth preferred embodiment of the control unit 46 shown in FIG. 5.
Figure 19B:
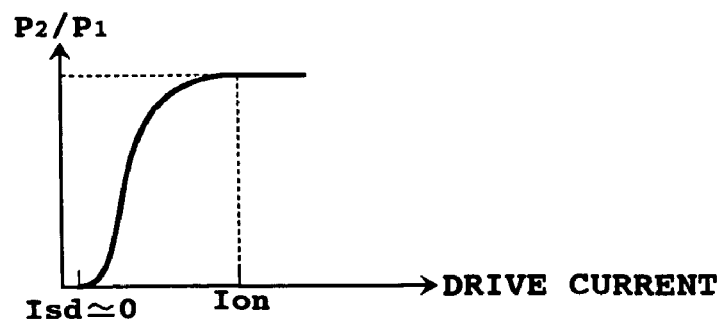
FIG. 19B is a graph showing a characteristic thereof.

FIG. 19A is a block diagram showing a sixth preferred embodiment of the control unit 46, and FIG. 19B is a graph showing a characteristic thereof. In this preferred embodiment, a semiconductor optical amplifier 118 is used as the optical element 48. The characteristic is such that the gain given as the ratio of an output power P2 to an input power P1 in the semiconductor optical amplifier 118 increases with an increase in drive current. Accordingly, a constant current source 120 for generating a drive current Ion giving a saturated gain is used as the optical output circuit 54, and a ground line 122 is used as the optical shutdown circuit 56.

When at least one of the power alarm and the wavelength alarm is generated, the semiconductor optical amplifier 118 is grounded through the switch 50 and gives only loss to the optical signal with no gain. Accordingly, the optical signal output from the optical modulator 24 is not passed through the semiconductor optical amplifier 118. When none of the power alarm and the wavelength alarm is generated, the drive current Ion is supplied from the constant current source 120 through the switch 50 to the semiconductor optical amplifier 118. Accordingly, gain is generated in the semiconductor optical amplifier 118, so that the optical signal output from the optical modulator 24 is amplified to be output from the optical sender.

Thus, according to this preferred embodiment, gain can be given to the optical signal when none of the power alarm and the wavelength alarm is generated, thereby allowing provision of a high-power optical sender. Further, like the previous preferred embodiments, interchannel crosstalk in WDM can be pevented without using an optical bandpass filter.

Figure 20A:
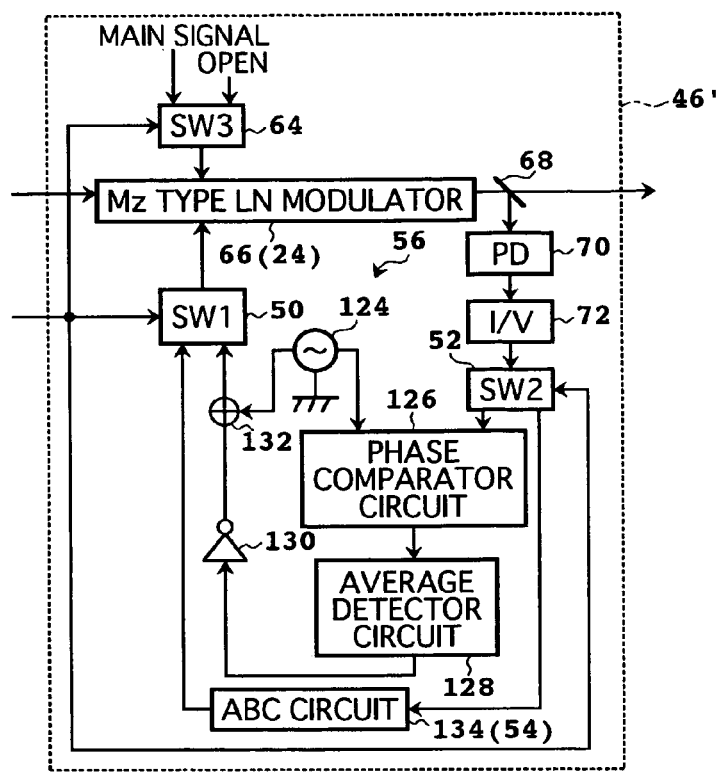
FIGS. 20A and 20B are block diagrams showing first and second preferred embodiments of a control unit 46' shown in FIG. 6, respectively.
Figure 20B:
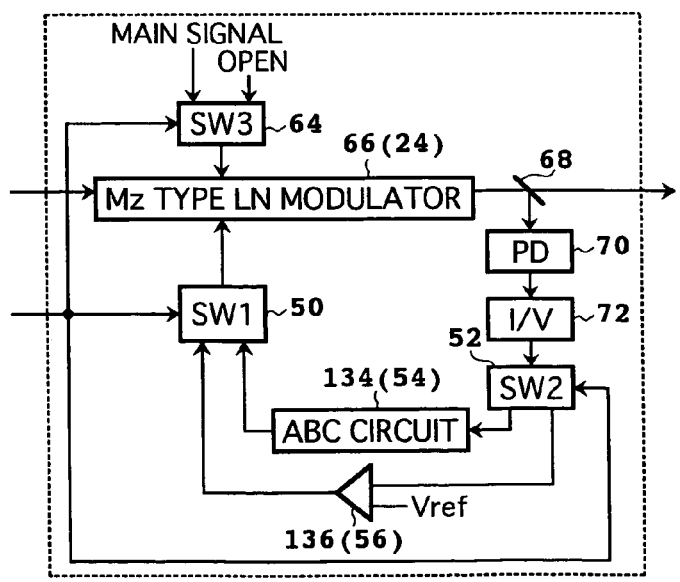

FIGS. 20A and 20B are block diagrams showing first and second preferred embodiments of the control unit 46' shown in FIG. 6, for example. As mentioned previously, the optical modulator 24 serves both to modulate a light beam and to shut down an optical signal in each of the following preferred embodiments. In each of the preferred embodiments shown in FIGS. 20A and 20B, an MZ type LN modulator 66 is used as the optical modulator 24.

In the preferred embodiment shown in FIG. 20A, the optical shutdown circuit 56 is provided by an oscillator 124, phase comparator circuit 126, average detector circuit 128, inverter 130, and adder 132. The oscillator 124, phase comparator circuit 126, average detector circuit 128, inverter 130, and adder 132 respectively correspond to the oscillator 78, phase comparator circuit 82, average detector circuit 84, inverter 88, and adder 80 shown in FIG. 13B. The optical output circuit 54 is provided by an automatic bias control (ABC) circuit 134.

When none of the power alarm and the wavelength alarm is generated, the operating point of the MZ type LN modulator 66 is maintained at a point shown by reference numeral 100 in FIG. 14, for example, in accordance with the operation of the ABC circuit 134. A main signal is supplied through the switch 64 to the MZ type LN modulator 66. Accordingly, an optical signal obtained by modulation of an input light beam in accordance with the main signal is output. The amplitude of the main signal is set to ½ of the period of the operating characteristic curve 92 shown in FIG. 14, for example. By this setting, the high level and the low level of the main signal respectively correspond to the maximum level and the minimum level of the operating characteristic curve 92, thereby allowing intensity modulation of CW light.

On the other hand, when at least one of the power alarm and the wavelength alarm is generated, the operating point is converged to a point shown by reference numeral 98 in FIG. 14, for example, in accordance with the principle similar to that in the preferred embodiment shown in FIG. 13B. Further, the switch 64 is opened and the main signal is therefore not supplied to the modulator 66. As a result, no optical signal is generated to obtain a shutdown condition.

Thus, according to this preferred embodiment, interchannel crosstalk in WDM can be prevented without using an optical bandpass filter. Further, since the MZ type LN modulator 66 is used both as a modulator and an optical element for shutting down an optical signal, the configuration of the optical sender can be simplified.

In the preferred embodiment shown in FIG. 20B, the optical output circuit 54 is provided by an ABC circuit 134, and the optical shutdown circuit 56 is provided by a comparator 136 supplied with a reference voltage Vref corresponding to a relatively small output optical power. When none of the power alarm and the wavelength alarm is generated, an optical signal is output from the modulator 66 as in the preferred embodiment shown in FIG. 20A. When at least one of the power alarm and the wavelength alarm is generated, the comparator 136 is selected by the switches 50 and 52, and the switch 64 is opened. Accordingly, no optical signal is output from the modulator 66. Also according to this preferred embodiment, interchannel crosstalk in WDM can be prevented with a simple configuration using no optical bandpass filter.

Figure 21:
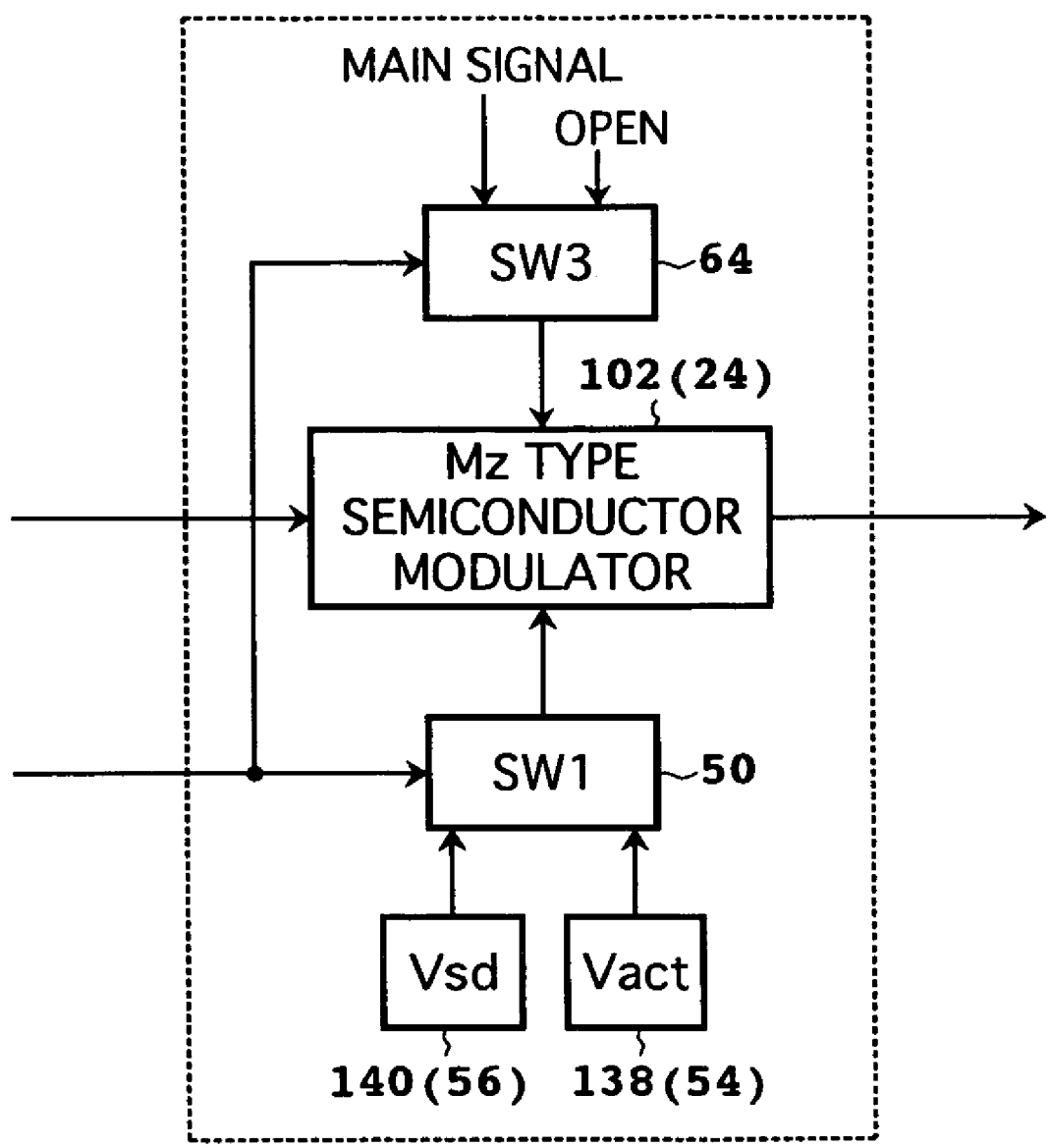
FIG. 21 is a block diagram showing a third preferred embodiment of the control unit 46' shown in FIG. 6.

FIG. 21 is a block diagram showing a third preferred embodiment of the control unit 46'. In this preferred embodiment, an MZ type semiconductor modulator 102 is used as the optical modulator 24. The optical output circuit 54 is provided by a voltage source 138 for outputting a voltage Vact giving an operating point where the positive or negative slope in the operating characteristic curve shown in FIG. 16B, for example, becomes a maximum. The optical shutdown circuit 56 is provided by a voltage source 140 corresponding to the voltage source 106 shown in FIG. 16A. The voltage Vact is illustrated as a voltage giving an operating point where the positive slope becomes a maximum in FIG. 16B.

When none of the power alarm and the wavelength alarm is generated, the voltage Vact is supplied from the voltage source 138 through the switch 50 to the modulator 102, and a main signal is supplied through the switch 64 to the modulator 102. Accordingly, an optical signal is output. When at least one of the power alarm and the wavelength alarm is generated, the voltage Vsd is supplied from the voltage source 140 through the switch 50 to the modulator 102, and the switch 64 is opened. Accordingly, no optical signal is output. Also according to this preferred embodiment, interchannel crosstalk in WDM can be prevented with a simple configuration using no optical bandpass filter.

Figure 22A:
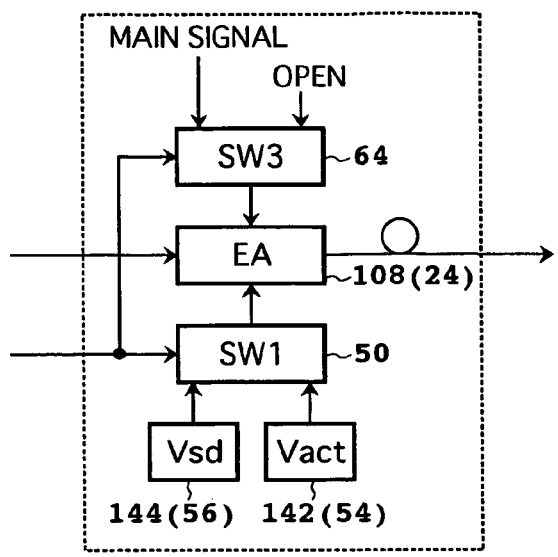
FIGS. 22A and 22B are block diagrams showing fourth and fifth preferred embodiments of the control unit 46' shown in FIG. 6, respectively.
Figure 22B:
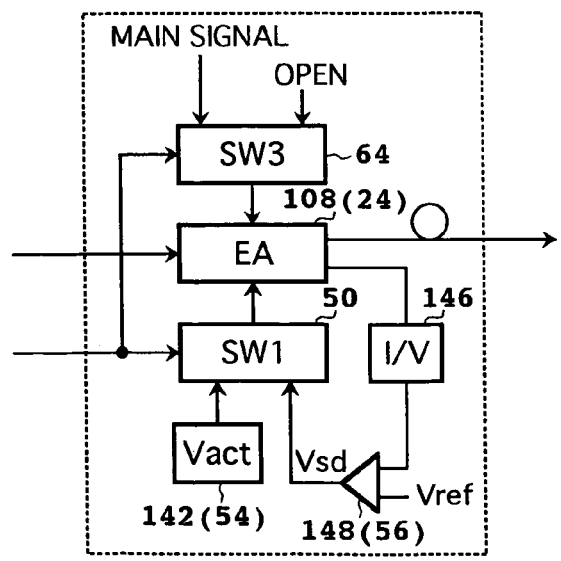

FIGS. 22A and 22B are block diagrams showing fourth and fifth preferred embodiments of the control unit 46', respectively. The fourth and fifth preferred embodiments shown in FIGS. 22A and 22B are intended to adapt the preferred embodiments of the control unit 46 shown in FIGS. 17A and 17B, respectively, to the control unit 46'.

In the preferred embodiment shown in FIG. 22A, the optical output circuit 54 is provided by a voltage source 142 for outputting a voltage Vact giving a substantially middle point between the voltages Vsd and Von in the operating characteristic curve shown in FIG. 18, for example, and the optical shutdown circuit 56 is provided by a voltage source 144 for giving the voltage Vsd. When none of the power alarm and the wavelength alarm is generated, the voltage Vact is supplied from the voltage source 142 through the switch 50 to the EA modulator 108, and a main signal is supplied through the switch 64 to the EA modulator 108. Accordingly, an optical signal is output. When at least one of the power alarm and the wavelength alarm is generated, the voltage Vsd is supplied from the voltage source 144 through the switch 50 to the EA modulator 108, and the switch 64 is opened. Accordingly, no optical signal is output. Also according to this preferred embodiment, interchannel crosstalk in WDM can be prevented with a simple configuration using no optical bandpass filter.

In the preferred embodiment shown in FIG. 22B, the photocurrent detected by the EA modulator 108 is converted into a voltage signal by an I/V converter 146, and this voltage signal is supplied to a comparator 148. The comparator 148 is supplied with a reference voltage Vref corresponding to a relatively small output optical power, and acts as the optical shutdown circuit 56. When none of the power alarm and the wavelength alarm is generated, the voltage Vact is supplied from the voltage source 142 through the switch 50 to the EA modulator 108, and a main signal is supplied from the switch 64 to the EA modulator 108. Accordingly, an optical signal is output. When at least one of the power alarm and the wavelength alarm is generated, a voltage signal giving a minimum output optical power is supplied from the comparator 148 through the switch 50 to the EA modulator 108, and the switch 64 is opened. Accordingly, no optical signal is output. Also according to this preferred embodiment, interchannel crosstalk in WDM can be prevented with a simple configuration using no optical bandpass filter.

Figure 23:
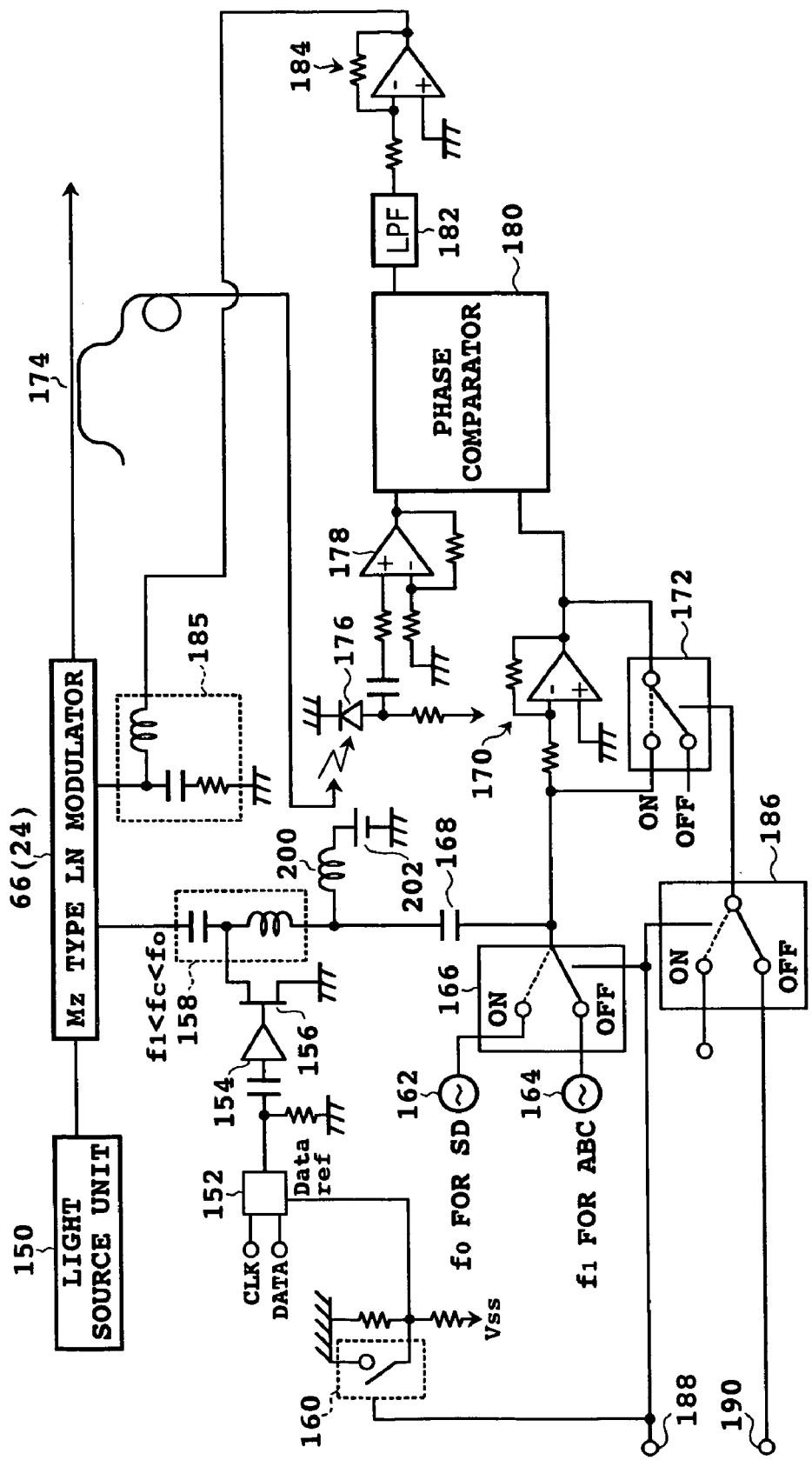
FIG. 23 is a block diagram showing a first preferred embodiment of the optical sender according to the present invention.
Figure 24:
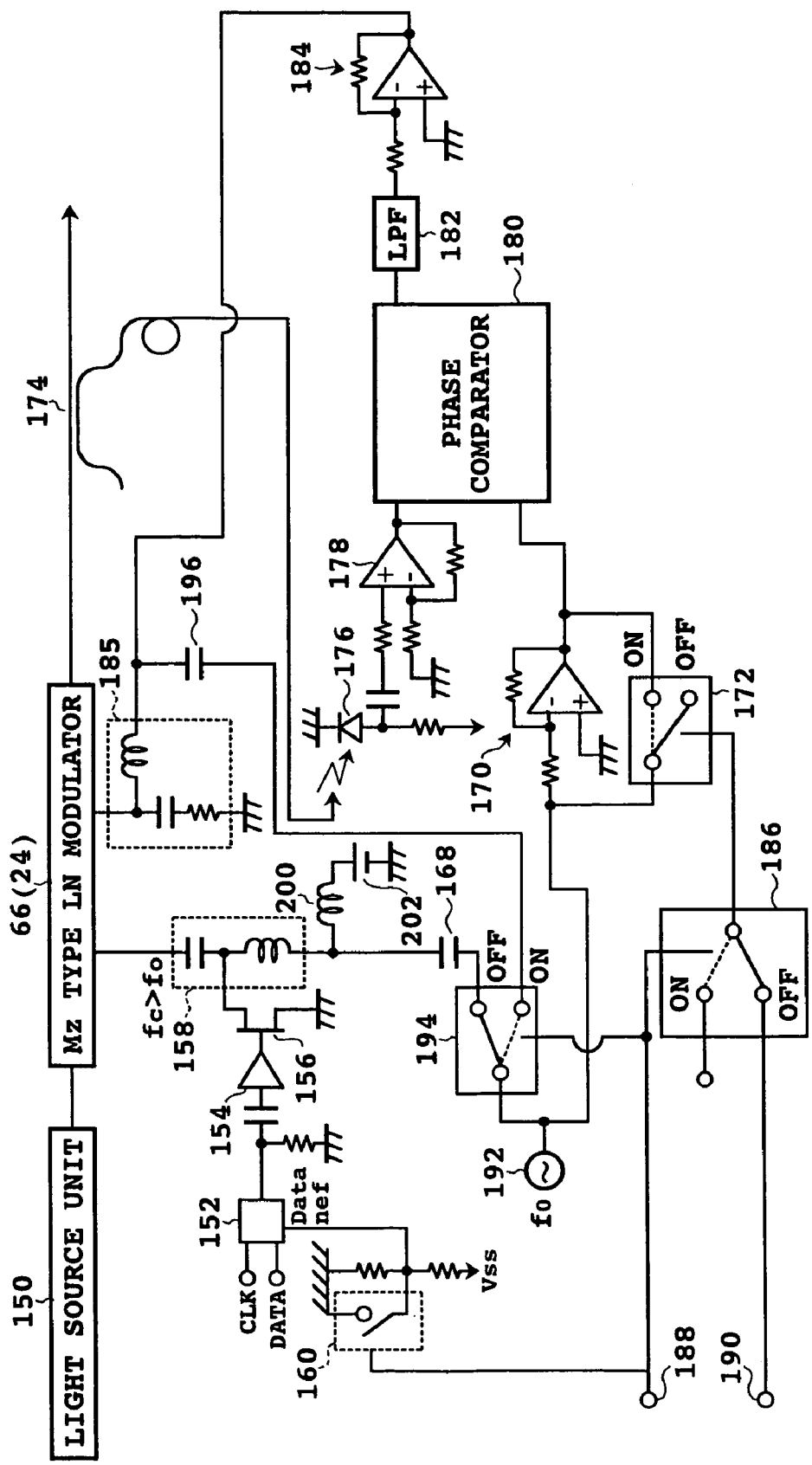
FIG. 24 is a block diagram showing a second preferred embodiment of the optical sender according to the present invention.

FIGS. 23 and 24 are block diagrams showing first and second preferred embodiments of the optical sender according to the present invention, respectively. Each of these preferred embodiments is characterized in that the optical output circuit 54 and the whole or a part of the optical shutdown circuit 56 in the preferred embodiment shown in FIG. 20A are used.

In the preferred embodiment shown in FIG. 23, an MZ type LN modulator 66 is used as the optical modulator 24. A light beam from a light source unit 150 is supplied to the modulator 66, and an optical signal obtained by modulating the light beam in the modulator 66 is output from this optical sender. It should be understood that the light source unit 150 includes the laser diode 20, the wavelength monitor 22, and the other associated elements shown in FIG. 6.

Clock (CLK) and data (DATA) are input into a D flip-flop circuit 152 to thereby obtain a main signal whose waveform has been shaped. A data reference terminal of the D flip-flop circuit 152 is selectively connected to a ground or a power supply by a switch 160, thereby selecting input or shutdown of the main signal. The main signal output from the D flip-flop circuit 152 is amplified by an amplifier 154, and the amplified main signal output from the amplifier 154 is supplied through an FET 156 and a biastee 158 as a driver to the modulator 66.

A voltage source 202 is connected through an inductor 200 to the biastee 158 for the FET 156, thereby applying a drain bias to the FET 156. An oscillator 162 for obtaining a shutdown (SD) condition where no optical signal is output and an oscillator 164 for automatic bias control (ABC) are used. The oscillation frequencies of the oscillators 162 and 164 are f0 and f1, respectively. The frequency f0 is set higher than the cutoff frequency fc of the biastee 158, and the frequency f1 is set lower than fc. A low-frequency signal from either the oscillator 162 or 164 selected by a switch 166 is supplied through a capacitor 168 and the biastee 158 to the modulator 66 and also to an inverting amplifier 170. A switch 172 is provided to selectively bypass the inverting amplifier 170.

A part of the optical signal output from the modulator 66 is branched off by an optical coupler 174, and the branch light is then supplied to a photodiode 176. As usual, the photodiode 176 is supplied with a reverse bias voltage, and a voltage signal due to a change in anode potential of the photodiode 176 reflects the power of the light input into the photodiode 176. The voltage signal output from the photodiode 176 is amplified by an amplifier 178, and the phase of an output signal from the amplifier 178 and the phase of an output signal from the inverting amplifier 170 are compared with each other in a phase comparator 180. An output signal from the phase comparator 180 is supplied through a low-pass filter (LPF) 182 to an inverting amplifier 184. An output signal from the inverting amplifier 184 is supplied through a biastee 185 to the modulator 66.

A port 188 is provided to receive a power alarm and a wavelength alarm, and a port 190 is provided to receive a control signal for chirp parameter switching. Switches 160, 166, 172, and 186 are operated according to the presence or absence of the power alarm or the wavelength alarm supplied to the port 188. One selective terminal of the switch 186 is connected to the port 190, and a voltage source for driving the switch 172 so that the inverting amplifier 170 is bypassed by the switch 172 is connected to the other selective terminal of the switch 186. When none of the power alarm and the wavelength alarm is generated, the switch 160 is operated so that the D flip-flop circuit 152 becomes an operative condition. Further, the switch 166 is operated so that the oscillator 164 for ABC is selected, and the switch 186 is operated so that the port 190 is connected to the switch 172.

In the case that the control signal for chirp parameter switching is not supplied to the port 190, the switch 172 is turned off and the inverting amplifier 170 is accordingly operated. As a result, the operating point of the modulator 66 is stabilized to a point giving a positive maximum slope as shown by reference numeral 100 in FIG. 14, and the modulation by the main signal is performed in the modulator 66, thus outputting an optical signal from this optical sender.

In the case that none of the power alarm and the wavelength alarm is generated and the control signal for chirp parameter switching is supplied to the port 190, the switch 172 is turned on and the inverting amplifier 170 is accordingly bypassed. As a result, the operating point of the modulator 66 is stabilized to a point giving a negative maximum slope, and the chirp parameter of an optical signal to be output is switched.

The reason why the oscillation frequency f1 of the oscillator 164 for ABC is set lower than the cutoff frequency fc of the biastee 158 is to superimpose a low-frequency signal of the frequency f1 on each of the high level and the low level of the main signal to be supplied to the modulator 66 in opposite phases.

According to this preferred embodiment, the chirp parameter of an optical signal to be output from the modulator 66 can be switched. Accordingly, an optimum chirp parameter can be selected so that best transmission characteristics are obtained according to the characteristics of an optical fiber transmission line to which the optical signal is output.

In the case that at least one of the power alarm and the wavelength alarm is generated, the switch 160 is operated so that the D flip-flop circuit 152 becomes inoperative. Further, the switch 166 is operated so that the oscillator 162 for SD is selected, and the switches 172 and 186 are operated so that the inverting amplifier 170 is bypassed. Accordingly, the operating point of the modulator 66 is converged to a point shown by reference numeral 98 in accordance with the principle described with reference to FIGS. 14 and 15. Further, since the D flip-flop circuit 152 is inoperative, the supply of the main signal to the modulator 66 is shut down, thus shutting down the output of the optical signal from this optical sender.

While the operating point of the modulator 66 is stabilized to a point giving a positive maximum slope or to a point giving a negative maximum slope according to setting of the chirp parameter prior to the establishment of this shutdown condition, it is apparent that the operating point is converged to a point shown by reference numeral 98 shown in FIG. 14 in each case because the inverting amplifier 184 is operative, so the detailed description thereof will be omitted herein.

FIG. 24 is a block diagram showing a second preferred embodiment of the optical sender according to the present invention. In contrast with the preferred embodiment shown in FIG. 23, the preferred embodiment shown in FIG. 24 is characterized in that an oscillator 192 oscillating at a frequency f0 is used both for SD and for ABC. The frequency f0 is set lower than the cutoff frequency fc of the biastee 158. The oscillator 192 is connected to a switch 194 and an inverting amplifier 170.

In the case that none of the power alarm and the wavelength alarm is generated, a low-frequency signal output from the oscillator 192 is supplied through the switch 194 and the capacitor 168 to the biastee 158, thereby performing ABC as similarly to the preferred embodiment shown in FIG. 23. Switching of the chirp parameter in this case is also similarly performed.

When at least one of the power alarm and the wavelength alarm is generated, the low-frequency signal from the oscillator 192 is supplied through the switch 194 and a capacitor 196 to the biastee 185. The principle of shutdown of an optical signal in this case will be understandable from the description of the preferred embodiment shown in FIG. 23, so the description thereof will be omitted herein.

According to the present invention, it is possible to provide an optical sender, terminal device, and optical communication system which can prevent interchannel crosstalk in WDM without using an optical bandpass filter. The effects exhibited by the specific preferred embodiments have been described above, so the description thereof will be omitted herein.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical sender comprising:
   a light source for outputting a light beam;
   an optical modulator for modulating said light beam in accordance with a main signal to output an optical signal; and
   means for shutting down said optical signal when receiving a wavelength alarm relating to the wavelength of said light beam, said wavelength alarm being provided inside the optical sender, and
   said shutting down means comprising:
      an optical element for receiving said optical signal output from said optical modulator; and
      means for controlling said optical element so that the transmittance of said optical element is reduced when receiving said wavelength alarm.

2. An optical sender according to claim 1, further comprising:
   a circuit for supplying a power to said light source; and a power supervisory circuit for monitoring on/off of supply of the power to said light source and outputting a power alarm during a given time period from a time the supply of the power to said light source becomes on or off.

3. An optical sender according to claim 2, wherein said power supplying circuit comprises a constant current source.

4. An optical sender according to claim 1, further comprising:
a wavelength monitor for detecting the wavelength of said light beam; and
a circuit for outputting said wavelength alarm when the wavelength detected by said wavelength monitor is deviated from a predetermined range.

5. An optical sender according to claim 4, further comprising means for controlling said light source so that the wavelength detected by said wavelength monitor is maintained constant.

6. An optical sender according to claim 5, wherein:
said light source comprises a laser diode; and
said controlling means comprises means for controlling the temperature of said laser diode.

7. An optical sender according to claim 4, wherein said wavelength monitor is provided between said light source and said optical modulator.

8. An optical sender according, to claim 4, wherein said optical modulator is provided between said light source and said wavelength monitor.

9. An optical sender according to claim 4, wherein:
said light source comprises a laser diode for outputting a forward beam and a backward beam; and
said forward beam being supplied to said optical modulator, said backward beam being supplied to said wavelength monitor.

10. An optical sender according to claim 1, wherein said optical element is a Mach-Zehnder type lithium niobate modulator.

11. An optical sender according to claim 1, wherein said optical element is a Mach-Zehnder type semiconductor modulator.

12. An optical sender according to claim 1, wherein said optical element is an electroabsorption type modulator.

13. An optical sender according to claim 1, wherein said optical element is a semiconductor optical amplifier.

14. An optical sender according to claim 1, wherein said shutting down means comprises means for switching the operating point of said optical modulator and shutting down input of said main signal into said optical modulator when receiving said wavelength alarm.

15. An optical sender according to claim 14, wherein said optical modulator is a Mach-Zehnder type lithium niobate modulator.

16. An optical sender according to claim 14, wherein said optical modulator is a Mach-Zehnder type semiconductor modulator.

17. An optical sender according to claim 14, wherein said optical modulator is an electroabsorption type modulator.

18. A terminal device for wavelength division multiplexing, comprising:
a plurality of optical senders for outputting optical signals having different wavelengths; and
an optical multiplexer for receiving said optical signals to output wavelength division multiplexed signal light,
wherein each of said optical senders comprises:
a light source for outputting a light beam;
an optical modulator for modulating said light beam in accordance with a main signal to output an optical signal; and
means for shutting down said optical signal when receiving a wavelength alarm relating to the wavelength of said light beam, said wavelength alarm being provided inside of the respective optical sender,
said shutting down means comprising:
an optical element for receiving said optical signal output from said optical modulator; and
means for controlling said optical element so that the transmittance of said optical element is reduced when receiving said wavelength alarm.

19. An optical communication system for wavelength division multiplexing, comprising:
first and second terminal devices; and
an optical fiber transmission line for connecting said first and second terminal devices,
wherein at least one of said first and second terminal devices comprises:
a plurality of optical senders for outputting optical signals having different wavelengths; and
an optical multiplexer for receiving said optical signals to output wavelength division multiplexed signal light,
wherein each of said optical senders comprises:
a light source for outputting a light beam;
an optical modulator for modulating said light beam in accordance with a main signal to output an optical signal; and
means for shutting down said optical signal when receiving a wavelength alarm relating to the wavelength of said light beam, said wavelength alarm being provided inside of the respective optical sender,
said shutting down means comprising:
an optical element for receiving said optical signal output from said optical modulator; and
means for controlling said optical element so that the transmittance of said optical element is reduced when receiving said wavelength alarm.

20. An optical communication system according to claim 19, further comprising at least one optical amplifier arranged along said optical fiber transmission line.

21. An optical sender comprising:
a light source outputting a light beam;
an optical modulator modulating said light beam in accordance with a main signal to output an optical signal; and
a shutting down device shutting down said optical signal when receiving a wavelength alarm relating to the wavelength of said light beam, said wavelength alarm being provided inside the optical sender,
said shutting down device comprising:
an optical element receiving said optical signal output from said optical modulator; and
a second controlling device controlling said optical element so that the transmittance of said optical element is reduced when receiving said wavelength alarm.

22. An optical sender according to claim 21, further comprising:
a circuit supplying a power to said light source; and
a power supervisory circuit monitoring on/off of supply of the power to said light source and outputting power alarm during a given time period from a time the supply of the power to said light source becomes on or off.

23. An optical sender according to claim 22, wherein said power supplying circuit comprises a constant current source.

24. An optical sender according to claim 21, further comprising:
a wavelength monitor detecting the wavelength of said light beam; and
a circuit outputting said wavelength alarm when the wavelength detected by said wavelength monitor is deviated from a predetermined range.

25. An optical sender according to claim 24, further comprising a first controlling device controlling said light source so that the wavelength detected by said wavelength monitor is maintained constant.

26. An optical sender according to claim 25, wherein:
said light source comprises a laser diode; and
said first controlling device comprising a temperature controller controlling the temperature of said laser diode.

27. An optical sender according to claim 24, wherein said wavelength monitor is provided between said light source and said optical modulator.

28. An optical sender according, to claim 24, wherein said optical modulator is provided between said light source and said wavelength monitor.

29. An optical sender according to claim 24, wherein:
said light source comprises a laser diode outputting a forward beam and a backward beam; and
said forward beam being supplied to said optical modulator, said backward beam being supplied to said wavelength monitor.

30. An optical sender according to claim 21, wherein said optical element is a Mach-Zehnder type lithium niobate modulator.

31. An optical sender according to claim 21, wherein said optical element is a Mach-Zehnder type semiconductor modulator.

32. An optical sender according to claim 21, wherein said optical element is an electroabsorption type modulator.

33. An optical sender according to claim 21, wherein said optical element is a semiconductor optical amplifier.

34. An optical sender according to claim 21, wherein said shutting down device comprises a switching device switching the operating point of said optical modulator and shutting down input of said main signal into said optical modulator when receiving said wavelength alarm.

35. An optical sender according to claim 34, wherein said optical modulator is a Mach-Zehnder type lithium niobate modulator.

36. An optical sender according to claim 34, wherein said optical modulator is a Mach-Zehnder type semiconductor modulator.

37. An optical sender according to claim 34, wherein said optical modulator is an electroabsorption type modulator.

38. A terminal device for wavelength division multiplexing, comprising:
a plurality of optical senders outputting optical signals having different wavelengths; and
an optical multiplexer receiving said optical signals to output wavelength division multiplexed signal light,
wherein each of said optical senders comprises:
a light source outputting a light beam;
an optical modulator modulating said light beam in accordance with a main signal to output an optical signal; and
a shutting down device shutting down said optical signal when receiving a wavelength alarm relating to the wavelength of said light beam, said wavelength alarm being provided inside of the respective optical sender, and said shutting down device comprises:
an optical element receiving said optical signal output from said optical modulator; and
a second controlling device controlling said optical element so that the transmittance of said optical element is reduced when receiving said wavelength alarm.

39. An optical communication system for wavelength division multiplexing, comprising:
first and second terminal devices; and
an optical fiber transmission line connecting said first and second terminal devices;
wherein at least one of said first and second terminal devices comprises,
a plurality of optical senders outputting optical signals having different wavelengths; and
an optical multiplexer receiving said optical signals to output wavelength division multiplexed signal light;
wherein each of said optical senders comprises:
a light source outputting a light beam;
an optical modulator modulating said light beam in accordance with a main signal to output an optical signal; and
a shutting down device shutting down said optical signal when receiving a wavelength alarm relating to the wavelength of said light beam, said wavelength alarm being provided inside of the respective optical sender, and said shutting down device comprises:
an optical element receiving said optical signal output from said optical modulator; and
a second controlling device controlling said optical element so that the transmittance of said optical element is reduced when receiving said wavelength alarm.

40. An optical communication system according to claim 39, further comprising at least one optical amplifier arranged along said optical fiber transmission line.

41. An optical sender, comprising:
a light source outputting a light beam;
an optical modulator modulating the light beam in accordance with a main signal to output an optical signal; and
a shut-down device shutting down the optical signal by switching an operating point of the optical modulator and shutting down an input of the main signal into the optical modulator when receiving a wavelength alarm relating to a wavelength of the light beam, the wavelength alarm being provided inside the optical sender.

42. A method, comprising:
outputting a light beam;
modulating the light beam in accordance with a main signal to output an optical signal; and
shutting down the optical signal by switching an operating point of the optical modulator and shutting down an input of the main signal into the optical modulator when receiving a wavelength alarm relating to a wavelength of the light beam, the wavelength alarm being provided inside an optical sender.

* * * * *

UNITED STATES PATENT AND TRADEMARK OFFICE
CERTIFICATE OF CORRECTION

| | | |
|---|---|---|
| PATENT NO. | : 7,133,610 B1 | Page 1 of 1 |
| APPLICATION NO. | : 09/168688 | |
| DATED | : November 7, 2006 | |
| INVENTOR(S) | : Yoshitaka Shimura et al. | |

It is certified that error appears in the above-identified patent and that said Letters Patent is hereby corrected as shown below:

Claim 28, Column 19, Line 24, after "according" delete ",".

Signed and Sealed this

Twentieth Day of March, 2007

JON W. DUDAS
*Director of the United States Patent and Trademark Office*